(12) United States Patent
Lin et al.

(10) Patent No.: US 8,352,265 B1
(45) Date of Patent: Jan. 8, 2013

(54) HARDWARE IMPLEMENTED BACKEND SEARCH ENGINE FOR A HIGH-RATE SPEECH RECOGNITION SYSTEM

(76) Inventors: Edward Lin, Pittsburgh, PA (US); Rob A. Rutenbar, Pittsburgh, PA (US)

( * ) Notice: Subject to any disclaimer, the term of this patent is extended or adjusted under 35 U.S.C. 154(b) by 799 days.

(21) Appl. No.: 12/341,640

(22) Filed: Dec. 22, 2008

Related U.S. Application Data

(60) Provisional application No. 61/009,030, filed on Dec. 24, 2007.

(51) Int. Cl.
*G10L 15/14* (2006.01)
*G10L 15/00* (2006.01)
*G10L 15/18* (2006.01)

(52) U.S. Cl. ........... 704/256.6; 704/256.1; 704/256; 704/257

(58) Field of Classification Search ........... 704/257
See application file for complete search history.

(56) References Cited

U.S. PATENT DOCUMENTS

| | | | |
|---|---|---|---|
| 5,699,456 A | 12/1997 | Brown et al. | |
| 5,794,197 A | 8/1998 | Alleva et al. | |
| 5,809,462 A | 9/1998 | Nussbaum | |
| 5,881,312 A | 3/1999 | Dulong | |
| 5,937,384 A | 8/1999 | Huang et al. | |
| 6,539,353 B1 | 3/2003 | Jiang et al. | |
| 6,629,073 B1 | 9/2003 | Hon et al. | |
| 6,671,669 B1 | 12/2003 | Garudadri et al. | |
| 6,804,642 B1 * | 10/2004 | Naylor | 704/231 |
| 6,836,758 B2 | 12/2004 | Bi et al. | |
| 7,024,359 B2 | 4/2006 | Chang et al. | |
| 7,080,011 B2 * | 7/2006 | Baumgartner et al. | 704/231 |
| 7,089,178 B2 | 8/2006 | Garudadri et al. | |
| 7,139,714 B2 | 11/2006 | Bennett et al. | |
| 7,203,368 B2 | 4/2007 | Nefian et al. | |
| 7,209,880 B1 | 4/2007 | Gajic et al. | |
| 7,274,819 B2 | 9/2007 | Matsugu et al. | |
| 7,328,153 B2 | 2/2008 | Wells et al. | |
| 7,360,068 B2 | 4/2008 | Borgatti et al. | |
| 7,451,081 B1 | 11/2008 | Gajic et al. | |

(Continued)

FOREIGN PATENT DOCUMENTS

GB 0420464.0 9/2004

(Continued)

OTHER PUBLICATIONS

Lin et al. "Moving Speech Recognition from Software to Silicon: the In Silico Vox Project". Interspeech Ninth International Conference on Spoken Language Processing, Pittsburg, PA, Sep. 17-21, 2006.*

(Continued)

*Primary Examiner* — Jesse Pullias
(74) *Attorney, Agent, or Firm* — David Garrod

(57) ABSTRACT

A hardware implemented backend search stage, or engine, for a speech recognition system is provided. In one embodiment, the backend search engine includes a number of pipelined stages including a fetch stage, an updating stage which may be a Viterbi stage, a transition and prune stage, and a language model stage. Each active triphone of each active word is represented by a corresponding triphone model. By being pipelined, the stages of the backend search engine are enabled to simultaneously process different triphone models, thereby providing high-rate backend searching for the speech recognition system. In one embodiment, caches may be used to cache frequently and/or recently accessed triphone information utilized by the fetch stage, frequently and/or recently accessed triphone-to-senone mappings utilized by the updating stage, or both.

24 Claims, 14 Drawing Sheets

U.S. PATENT DOCUMENTS

| | | | |
|---|---|---|---|
| 7,457,750 | B2 | 11/2008 | Rose et al. |
| 7,473,258 | B2 * | 1/2009 | Clauson et al. ............... 606/139 |
| 7,480,617 | B2 * | 1/2009 | Chu et al. ...................... 704/256 |
| 7,587,319 | B2 | 9/2009 | Catchpole |
| 7,877,258 | B1 | 1/2011 | Chelba et al. |
| 2008/0255839 | A1 | 10/2008 | Larri et al. |
| 2009/0043818 | A1 | 2/2009 | Raichelgauz et al. |
| 2009/0304268 | A1 | 12/2009 | Cadambi et al. |
| 2010/0094858 | A1 | 4/2010 | Indeck et al. |
| 2010/0211391 | A1 | 8/2010 | Chen |

FOREIGN PATENT DOCUMENTS

| | | |
|---|---|---|
| JP | 2001265383 | 9/2001 |
| KR | 20020048357 | 6/2002 |
| WO | 98/57489 A2 | 12/1998 |
| WO | 01/31628 A2 | 5/2001 |
| WO | WO 01/31628 A2 | 5/2001 |
| WO | 02/07148 A1 | 1/2002 |
| WO | 02/31816 A1 | 4/2002 |
| WO | WO 03/094152 | 4/2003 |
| WO | WO2006030214 | 3/2006 |
| WO | 2007/098055 A2 | 8/2007 |
| WO | 2009/070931 A1 | 6/2009 |
| WO | 2009/088718 A2 | 7/2009 |

OTHER PUBLICATIONS

L. Bottou et al., "Speaker-Independent Isolated Digit Recognition: Multilayer Perceptrons vs. Dynamic Time Warping," Neural Networks, vol. 3, 1990, pp. 453-455.

S. Lee et al., "Application of Fully Recurrent Neural Networks for Speech Recognition," IEEE, 1991, pp. 77-80.

R. Lipmann, "Review of Neural Networks for Speech Recognition," Neural Computation, 1989, pp. 1-38.

A. Waibel, "Modular Construction of Time-delay Neural Networks for Speech Recognition," Neural Computation, 1989. pp. 39-46.

K. Lang et al., "A Time-Delay Neural Network Architecture for Isolated Word Recognition," Neural Networks, vol. 3,1990, pp. 23-43.

S. Kong et al., "Differential Competitive Learning for Centroid Estimation and Phoneme Recognition," IEEE Transactions on Neural Networks, vol. 2, No. 1, Jan. 1991, pp. 118-124.

S. Escola et al., "Hidden Markov Models for the Stimulus-Response Relationships of Multistate Neural Systems," Neural Computation 23, pp. 1071-1132 (2011).

R. Veitch et al., "FPGA Implementation of a Pipelined Gaussian Calculation for HMM-Based Large Vocabulary Speech Recognition," International Journal of Reconfigurable Computing, 2011, pp. 1-10.

O. Cheng, et al., "Hardware-Software Codesign of Automatic Speech Recognition System for Embedded Real-Time Applications," IEEE Transactions on Industrial Electronics, vol. 58, No. 3, Mar. 2011, pp. 850-859.

A. Chun, et al., "ISIS: An Accelerator for Sphinx Speech Recognition," 2011 IEEE 9th Symposium on Application Specific Processors (SASP), pp. 58-61.

P. EhKan, et al., "FPGA Implementation for GMM-Based Speaker Identification," International Journal of Reconfigurable Computing, vol. 2011, pp. 1-8.

P. Li, et al., "Design of a Low-Power Coprocessor for Mid-Size Vocabulary Speech Recognition Systems," IEEE Transactions on Circuits and Systems—I: Regular Papers, vol. 58, No. 5, May 2011, pp. 961-970.

L. Li, et al., "Design of Speech Recognition Co-Processor with Fast Gaussian Likelihood Computation," 3rd International Conference on Computer Research and Development (ICCRD), Mar. 11-13, 2011, pp. 392-395.

K. You, et al., "Memory Access Optimized VLSI for 5000-Word Continuous Speech Recognition," J Sign Process Syst, vol. 63 (2011), pp. 95-105.

K. You, et al., "Flexible and Expandable Speech Recognition Hardware with Weighted Finite State Transducers," J Sign Process Syst, published online May 15, 2011.

S Glinski et al., "Spoken Language Recognition on a DSP Array Processor," IEEE Transactions on Parallel and Distributed Systems, Jul. 5, 1994, No. 7, New York, USA, pp. 697-703.

S. Chatterjee et al., "Connected Speech Recognition on a Multiple Processor Pipeline," ICASSP 89, May 23, 1989, Glasgow, UK, pp. 774-777.

R. Krishna et al., "Architectural Optimizations for Low-Power, Real-Time Speech Recognition," CASES '03: Proceedings of the 2003 International Conference on Compilers, Architecture and Synthesis for Embedded Systems, ACM, New York, NY, USA, pp. 220-231.

T. S. Anantharaman et al., "A hardware accelerator for speech recognition algorithms," Proceedings of the 13th Annual International Symposium on Computer architecture, p. 216-223, Jun. 2-5, 1986.

R. Dujari, "Parallel Viterbi Search Algorithm for Speech Recognition," M.S. Thesis, Mass. Inst. of Tech., Feb. 1992.

J. Chong et al., "Data-Parallel Large Vocabulary Continuous Speech Recognition on Graphics Processors," Technical Report No. UCB/EECS-2008-69, May 22, 2008.

M. Ravishankar, "Parallel implementation of fast beam search for speaker-independent continuous speech recognition," 1993.

L. Baugh et al., "Sphinx Parallelization," Sep. 16, 2002.

S.-H. Chung et al., "A Parallel Phoneme Recognition Algorithm Based on Continuous Hidden Markov Model," 13th International and 10th Symposium on Parallel and Distributed Processing, 1999.

M. Fleury et al., "Parallel Structure in an Integrated Speech-Recognition Network," Euro-Par'99, LNCS 1685, pp. 995-1004, 1999.

J Chong et al., "Opportunities and Challenges of Parallelizing Speech Recognition," Proceedings of the 2nd USENIX conference on Hot topics in parallelism, USENIX Association, Berkeley, CA, 2010.

H. Bourlard et al., "Multi-stream speech recognition," Technical Report RR 96-07, IDIAP Research Institute, Martigny, Switzerland, Dec. 1996.

E. C. Lin et al., "A 1000-Word Vocabulary, Speaker-Independent, Continuous Live-Mode Speech Recognizer Implemented in a Single FPGA," FPGA'07, Feb. 18-20, 2007, Monterey, CA, pp. 60-68.

R. A. Kavaler et al., "A dynamic-time-warp integrated circuit for a 1000-word speech recognition system," IEEE J. of Solid State Circuits, Feb. 1987, pp. 3-14.

L. Cali et al., "CO-Design Method Enables Speech Recognition SoC," EETimes, Nov. 2001, p. 12.

B. Mathew et al., "A Low-Power Accelerator for the SPHINX 3 Speech Recognition System," CASES'03, Oct. 30-Nov. 1, 2003, San Jose, CA, pp. 210-219.

S. Nedevschi et al., "Hardware Speech Recognition on Low-Cost and Low-Power Devices," Proc. Design and Automation Conference, 2005, pp. 684-689.

A. Stolzle et al., "Integrated Circuits for a Real-Time Large-Vocabulary Continuous Speech Recognition System," IEEE Journal of Solid-State Circuits, vol. 26, No. 1, pp. 2-11, Jan. 1991.

L. D. Paulson, "Speech Recognition Moves from Software to Hardware," IEEE Computer, Nov. 2006, pp. 15-18.

T. Fujinaga et al., "Parallelized Viterbi Processor for 5,000-Word Large-Vocabulary Real-Time Continuous Speech Recognition FPGA System," Interspeech 2009, pp. 1483-1486.

S. Yoshizawa et al., "Scalable Architecture for Word HMM-Based Speech Recognition and VLSI Implementation in Complete System," IEEE Trans. on Circuits and Systems, Jan. 2006, pp. 70-77.

P. Cardinal et al., "GPU Accelerated Acoustic Likelihood Computations," Interspeech 2008.

P. J. Bourke et al., "A Low-Power Hardware Search Architecture for Speech Recognition," Interspeech 2008.

K. You et al., "Architectural Design and Implementation of an FPGA Softcore Based Speech Recognition System," 6th International Workshop on System on Chip for Real Time Applications, Dec. 2006, pp. 50-55.

A. Burstein et al., "Using Speech Recognition in a Personal Communications System," ICC '92, Jun. 1992, pp. 1717-1721.

P. Saha, "Application Hardware-Software Co-Design for Reconfigurable Computing Systems," Ph.D. thesis, George Washington Univ., May 2008.

H. Wei, "A speech recognition IC with an efficient MFCC extraction algorithm and multi-mixture models," Ph.D. thesis, The Chinese University of Hong Kong (Hong Kong), 2006 (Preview).

S.-H. Chung, et al., "A Parallel Phoneme Recognition Algorithm Based on Continuous Hidden Markov Model," 13th International and 10th Symposium on Parallel and Distributed Processing, Apr. 1999, pp. 453-457.

A. Seward, "A fast HMM match algorithm for very large vocabulary speech recognition," Speech Communication 42 (2004), pp. 191-206.

M.-Y. Hwang, et al., "Predicting Unseen Triphones with Senones," IEEE Trans. on Speech and Audio Processing, vol. 4, No. 6, Nov. 1996, pp. 412-419.

Glinski,et al., "Spoken language recognition on a DSP array processor," IEEE transactions on parallel and distributed systems, Jul. 1994, pp. 697-703.

Chatterjee, et al., "Connected speech recognition on a multiple processor pipeline," 1989 International Conference on Acoustics, Speech, and Signal Processing, May 23, 1989, pp. 774-777.

Introduction to Automatic Speech Recognition, 6.345 Automatic Speech Recognition, Lecture # 1, MIT, 2003.

Acoustic Theory of Speech Production, 6.345 Automatic Speech Recognition, Lecture # 2, MIT, 2003.

Speech Sounds of American English, 6.345 Automatic Speech Recognition, Lecture # 3-4, MIT, 2003.

Speech Signal Representation, 6.345 Automatic Speech Recognition, Lecture # 5, MIT, 2003.

Vector Quantization and Clustering, 6.345 Automatic Speech Recognition, Lecture # 6, MIT, 2003.

Pattern Classification, 6.345 Automatic Speech Recognition, Lecture # 7, MIT, 2003.

Pattern Classification, 6.345 Automatic Speech Recognition, Lecture # 8, MIT, 2003.

Dynamic Time Warping & Search, 6.345 Automatic Speech Recognition, Lecture # 9, MIT, 2003.

Hidden Markov Modelling, 6.345 Automatic Speech Recognition, Lecture # 10, MIT, 2003.

Language Modelling for Speech Recognition, 6.345 Automatic Speech Recognition, Lecture # 11-12, MIT, 2003.

A Practical Introduction to Graphical Models and their use in ASR, 6.345 Automatic Speech Recognition, Lecture # 13, MIT, 2003.

R. Singh, Part I: Designing HMM-based ASR systems, 6.345 Automatic Speech Recognition, Lecture # 14, MIT, 2003.

R. Singh, Part II: Training continuous density HMMs, 6.345 Automatic Speech Recognition, Lecture # 15, MIT, 2003.

Segment-Based Speech Recognition, 6.345 Automatic Speech Recognition, Lecture # 16, MIT, 2003.

Finite-State Techniques for Speech Recognition, 6.345 Automatic Speech Recognition, Lecture # 17, MIT, 2003.

ASR for Spoken-Dialogue Systems, 6.345 Automatic Speech Recognition, Lecture # 18, MIT, 2003.

Modelling New Words, 6.345 Automatic Speech Recognition, Lecture # 19, MIT, 2003.

T. J. Hazen, Noise Robustness and Confidence Scoring, 6.345 Automatic Speech Recognition, Lecture # 20, MIT, 2003.

T. J. Hazen, Speaker Adaptation, 6.345 Automatic Speech Recognition, Lecture # 21, MIT, 2003.

Conversational Systems: Advances and Challenges, 6.345 Automatic Speech Recognition, Lecture # 22, MIT, 2003.

Paralinguistic Information Processing, 6.345 Automatic Speech Recognition, Lecture # 23, MIT, 2003.

Jeong, H., et al., English language abstract of KR1020060108895, "Speech Recognition Apparatus Using Two-Level Dynamic Programming Technique and Hidden Markov Model," Oct. 18, 2006.

Jeong, H., et al., English language abstract of KR1020050037125, "Apparatus for Recognizing Speech Using Hidden Markov Model, Without Using Computer," Apr. 21, 2005.

Shah, S.R., et al., English language abstract of KR1020060018888, "System and Method for Distributed Speech Recognition With a Cache Feature," Mar. 2, 2006.

Och, F., et al., U.S. Appl. No. 60/775,570, filed Feb. 21, 2006.

Och, F., et al., U.S. Appl. No. 60/774,790, filed Feb. 17, 2006.

Spec sheet entitled, "Speech Recognition IC," http://www.talentedsoft.com, Aug. 9, 2010.

"Philips New Speech Recognition IC," http://www.futurlec.com/News/Philips/SpeechChip.html, 1999.

Email entitled, "Voice Recognition Processors (Database): Nov. 29, 1995 Version."

W. Han, et al., "A Speech Recognition IC Using Hidden Markov Models with Continuous Observation Densities," Journal of VLSI Signal Processing 47, pp. 223-232, 2007.

W. Han, et al., "A Real-Time Chinese Speech Recognition IC With Double Mixtures," IEEE, 2003.

Spec sheet entitled, "NLP-5x: Natural Language Processor With Motor, Sensor and Display Control," Sensory Inc., 2010.

S J Melnikoff, et al., "Implementing a Simple Continuous Speech Recognition System on an FPGA," Proceedings of the 10th Annual IEEE Symposium on Field-Programmable Custom Computing Machines (FCCM'02), 2002.

S J Melnikoff, et al., "Performing Speech Recognition on Multiple Parallel Files Using Continuous Hidden Markov Models on an FPGA," Proc. 2002 IEEE International Conference on Field-Programmable Technology, Dec. 16, 2002.

S J Melnikoff, et al., "Implementing log-add algorithm in hardware," Electronics Letters, Jun. 12, 2003.

S J Melnikoff, et al., "Speech Recognition on an FPGA Using Discrete and Continuous Hidden Markov Models," Proceedings of the 12th International Conference on Field-Programmable Logic and Applications: Reconfigurable Computing is Going Mainstream, 2002.

S J Melnikoff, et al., "Reconfigurable Computing for Speech Recognition: Preliminary Findings," Proceedings of the 10th International Workshop on Field-Programmable Logic and Applications: The Roadmap to Reconfigurable Computing, 2000.

S J Melnikoff, et al., "Implementing a Hidden Markov Model Speech Recognition System in Programmable Logic," Proceedings of the 11th International Conference on Field-Programmable Logic and Applications, 2001.

S J Melnikoff, "Speech Recognition in Programmable Logic," Ph.D. Thesis, University of Birmingham, Nov. 2003.

F A Elmisery, et al., "A FPGA-Based HMM for a Discrete Arabic Speech Recognition System," Proceedings of the 15th International Conference on Microelectronics, Dec. 9, 2003.

G. Marcus, et al., "An FPGA-based Coprocessor for the SPHINX Speech Recognition System: Early Experiences," International Conference on Reconfigurable Computing and FPGAs, Sep. 28, 2005.

G-D Wu, et al., "Chip Design of LPC-cepstrum for Speech Recognition," 6th IEEE/ACIS International Conference on Computer and Information Science, Jul. 11, 2007.

K Miura, et al., "A Low Memory Bandwidth Gaussian Mixture Model (GMM) Processor for 20,000-Word Real-Time Speech Recognition FPGA System," International Conference on ICECE Technology, Dec. 8, 2008.

J. Chaiwongsai, et al., "An Architecture of HMM-Based Isolated-Word Speech Recognition with Tone Detection Function," 2008 International Symposium on Intelligent Signal Processing and Communication Systems, Feb. 8, 2009.

W. Han, et al., "A Speech Recognition IC Using Hidden Markov Models with Continuous Observation Densities," Journal of VLSI Signal Processing Systems, vol. 47, Issue 3, Jun. 2007.

O. Cheng, "Embedded Speech Recognition Systems," Ph.D. Thesis, Univ. of Auckland, Sep. 2008.

O. Cheng, et al., "Hardware-Software Codesign of Automatic Speech Recognition System for Embedded Real-Time Applications," IEEE Trans. on Industrial Electronics, Mar. 2011.

R. Veitch, et al., "Acceleration of HMM-based speech recognition system by parallel FPGA Gaussian calculation," VI Southern Programmable Logic Conference, Mar. 24, 2010.

J. Choi, et al., "An FPGA implementation of speech recognition with weighted finite state transducers," 2010 IEEE International Conference on Acoustics Speech and Signal Processing (ICASSP), Mar. 14, 2010.

A. Gomperts, et al., "Development and Implementation of Parameterized FPGA-Based General Purpose Neural Networks for Online Applications," IEEE Transactions on Industrial Informatics, Feb. 2011.

K. You, et al., "Flexible and Expandable Speech Recognition Hardware with Weighted Finite State Transducers," J. of Signal Processing Systems, May 15, 2011.

R. Veitch, et al., "FPGA Implementation of a Pipelined Gaussian Calculation for HMM-Based Large Vocabulary Speech Recognition," International Journal of Reconfigurable Computing, Sep. 2010.

E. Lin, "A High Speed Speech Recognition Hardware Engine," Ph.D. Thesis Proposal, Carnegie Mellon University, Pittsburgh, PA, Feb. 21, 2006.

E.C. Lin, et al., "A 1000-Word Vocabulary, Speaker-Independent, Continuous Live-Mode Speech Recognizer Implemented in a Single FPGA," Proc. ACM International Symposium on FPGAs, Feb. 2007.

E. Lin, "A High Performance Custom Hardware Backend Search Engine for a Speech Recognition System," Ph.D. Thesis, Carnegie Mellon University, Pittsburgh, PA, Dec. 13, 2007.

"The Talking Cure," The Economist (Technology Quarterly Issue), p. 11, Mar. 12, 2005.

E. Lin, "A First Generation Hardware Reference Model for a Speech Recognition Engine," M.S. Thesis, Carnegie Mellon University, Pittsburgh, PA, May 1, 2003.

P. Bourke, et al., "A High-Performance Hardware Speech Recognition System for Mobile Applications," Proc. Semiconductor Research Corporation TECHCON, Aug. 2005.

E.C. Lin, et al., "In Silico Vox: Toward Speech Recognition in Silicon," 2006 (Eighteenth) Hot Chips Symposium, Aug. 2006.

S. Shankland, "Chips Promise to Boost Speech Recognition," CNET News.com, Aug. 22, 2006.

L.D. Paulson, "Speech Recognition Moves from Software to Hardware," IEEE Computer, pp. 15-18, Nov. 2006.

R.A. Rutenbar, "Toward Speech Recognition in Silicon: the Carnegie Mellon in Silico Vox Project," Invited Talk, 2007 Brammer Memorial Lecture, Wayne State University, Oct. 2007.

K. Yu, et al., "Generating Small, Accurate Acoustic Models with a Modified Bayesian Information Criterion," Proc. Interspeech 2007, Aug. 2007.

P. Bourke, et al., "A Low-Power Hardware Search Architecture for Speech Recognition," Proc Interspeech '08, Sep. 2008.

Kim, CM, et al., "A digital chip for robust speech recognition in noisy environment," Proceedings (ICASSP '01) 2001 IEEE International Conference on Acoustics, Speech, and Signal Processing, May 7, 2001.

Buitrago, J., et al., "Speech Recognition System and its Automatic Synthesis in Hardware," IEEE Conf. on Electronics, Robotics and Automotive Mechanics Conference, Sep. 28, 2010, pp. 672-676.

* cited by examiner

HARDWARE IMPLEMENTED BACKEND SEARCH ENGINE FOR A HIGH-RATE SPEECH RECOGNITION SYSTEM

This application claims the benefit of provisional patent application Ser. No. 61/009,030, filed Dec. 24, 2007, the disclosure of which is hereby incorporated herein by reference in its entirety.

This invention was made with government support under HR0011-07-3-0002 awarded by DARPA. The Government may have certain rights in this invention.

FIELD OF THE DISCLOSURE

The present invention relates to speech recognition, and more particularly relates to a hardware implemented backend search engine for a speech recognition system.

BACKGROUND

Speech recognition tools translate human speech data into searchable text. Whether running on a desktop personal computer (PC) or an enterprise server farm, today's state-of-the-art speech recognizers exist as complex software running on conventional computers. This is profoundly limiting for applications that require extreme recognition speed. Today's most sophisticated recognizers fully occupy the computational resources of a high-end server to deliver results at, or near, real-time speed where each hour of audio input requires roughly one hour of computation for recognition. Applications range from homeland security, such as searching through large streams of audio intercepts for threats to national security, to video indexing, such as automatically creating a computer-readable text transcription from an audio component or soundtrack of a recorded video.

The high level architecture of a modern, state-of-the-art speech recognition system 10 is illustrated in FIG. 1. The speech recognition system 10 is implemented in software and includes a feature extraction stage 12, an acoustic scoring stage 14, and a backend search stage 16. Generally, speech is acquired, digitized by an analog-to-digital converter (ADC), and segmented into a sequence of overlapping windows at roughly millisecond-level granularity. From here, the first step in recognition is to extract meaningful information from each speech segment at the feature extraction stage 12. The feature extraction stage 12 uses digital signal processing (DSP) techniques find the best parameters, or features, to uniquely discriminate different sounds. This involves a set of filtering actions, spectral analysis (via Fast Fourier Transform (FFT)), nonlinear combination of spectral components in ways consistent with the physiology of the human auditory system, and the calculation of time derivatives of these quantities over several frames of speech to track dynamics. Several common methods have evolved, most notably Mel-Frequency Cepstral Coefficients (MFCC) and Perceptual Linear Prediction (PLP). At the output of the feature extraction stage 12, the features are assembled into a feature vector and passed to the acoustic scoring stage 14. The feature vector is a unique "fingerprint" for speech heard in one input frame.

Next, the acoustic scoring stage 14 receives the feature vector for the speech heard in one input frame, and matches the feature vector against a large library of stored atomic sounds. These atomic sounds are obtained from training over a very large number of speakers, all speaking from a target vocabulary. In the earliest recognizers, these atomic units of speech were phonemes, or phones, where phones are the smallest units of sound that distinguish meaning in different words. There are approximately 50 such phones in the English language, corresponding roughly to the familiar consonant and vowel sounds. For example, "five" has three phones: /f/ /i/ /v/, and "nine" also has three phones: /n/ /i/ /n/. Modern recognizers improve on this idea by modeling phones in context, as illustrated in FIG. 2. For example, the middle vowel /i/ sound in "five" is different than the middle vowel /i/ sound in "nine" because of context. Therefore, as a first complication, for the English language, roughly 50×50×50 sounds—now called triphones—are modeled as the library of recognizable acoustic units. Note that different languages have different basic phones, but the idea works across languages. Each of these ~100,000 sounds is further decomposed into a set of frame-sized sub-acoustic units called senones. A complete model, which is referred to as an acoustic model, at this stage typically has several thousand senones.

Thus, the goal of the acoustic scoring stage 14 is to match the feature vector (a point in feature space) received from the feature extraction stage 12 against a library of atomic sounds (senones, each a complex region in feature space). The most common strategy is to model each senone as a Gaussian Mixture Model (GMM), where a GMM is a weighted sum of Gaussian density functions, each with an appropriately fit mean (center) and variance (radius). For every senone, the acoustic scoring stage 14 calculates a number—a calculated GMM probability—that the just-heard feature matches that senone. Assuming diagonal covariance matrix, the GMM probability for each senone is calculated based on the following equation:

$$PROB_s(X) = \sum_{i=1}^{n(s)} \frac{w_{s,i}}{\sqrt{(2\pi)^d |\Lambda_{s,i}|}} \exp\left(\sum_{j=1}^{d} -\frac{1}{2\sigma_{s,i,j}^2}(x_j - \mu_{s,i,j})^2\right),$$

where $n(s)$ is the number of Gaussians in the mixture, $w_{s,i}$ is a weight of the i-th Gaussian for senone s, $|\Lambda_{s,i}|$ is the determinant of covariance matrix $\Lambda_{s,i}$ for the i-th Gaussian for senone s, $\sigma_{s,i,j}^2$ is the variance for the j-th dimension of d-dimensional density for the i-th Gaussian for senone s, $x_j$ is the j-th element of d-dimensional feature vector X, and $\mu_{s,i,j}$ is the j-th element of a d-dimensional mean for the i-th Gaussian for senone s.

In conventional usage, the logarithm (log) of the GMM probability is used for subsequent computational convenience. This log(probability) is calculated for each senone and delivered to the following backend search stage 16. A complex acoustic model can easily have 10,000 senones, each modeled with 64 Gaussians, in a space dimension between 30 and 50. The output of the acoustic scoring stage 14 is a vector of scores—10,000 log(probability) numbers, in this case—one per senone. Note that a new feature vector is input to the acoustic scoring stage 14 for each frame of sampled speech. In response, the acoustic scoring stage 14 outputs a vector of scores including one score per senone for each frame of sampled speech based on the corresponding feature vector.

The backend search stage 16 delivers a set of most-likely-to-be-heard words as its output based on senone scores provided by the acoustic scoring stage 14 for each frame of sampled speech. Specifically, the backend search stage 16 uses a layered recognition model to first assemble features into triphones (each modeled as a sequence of senones), then into words (stored in a dictionary, each modeled as a sequence of triphones). At the lowest, acoustic level of this process, Hidden Markov Models (HMMs) are used to model each triphone where senones are the states in each HMM. As illustrated in FIG. 3, each triphone is modeled as a linear sequence of states (senones). Looping self-arrows allow for an individual senone to extend over the time for more than one frame of sampled speech. Rightward arrows model progression from one senone, or atomic sound, to another in this triphone. Each transition (represented by an arrow) has a transition probability. An ending "null" state allows the triphone to connect to a following triphone. Mechanically, for each frame of sampled speech, the acoustic scoring stage 14 delivers a set of senone scores, or log(probability) numbers, including a score for each senone. The backend search stage 16 then scores triphones based the senone scores for states of the corresponding HMMs.

Each word in a vocabulary of the speech recognition system 10 to be recognized is decomposed into a set of "overlapping" triphones, i.e., the ending context of one triphone is the beginning context of the next. FIG. 4 shows an example of connecting the triphones /h/ and /i/ in "hi," preceded and followed by silences.

At the top layer of the backend search process, a language model provides additional statistical knowledge of likely word sequences to further aid recognition. As illustrated in FIG. 5, an n-gram model stores probabilities for individual words (unigrams), two-word (bigram), and three-word (trigram) sequences. At its most fundamental level, the backend search stage 16 constructs a network in which the entire language is represented as a huge directed graph. This graph is itself a cross-product of three separate sets of graphs: a language model, which represents words in likely context; a phonetic model of each word, i.e., a linear sequence of phones for each word; and an acoustic model, which is a linear sequence of feature-matched senones for each phone. FIG. 6 shows an example of the language, phone, and acoustic layers of the backend search process for a simple example with a two-word vocabulary. There are two components to search: the construction of the graph, and the process of finding the best path through the graph. In practical recognition systems, the graph is vastly too large to be statically constructed, and so is built dynamically, frame by frame. Pruning operations remove unlikely (low probability) nodes as needed. The best path through the graph can be found using strategies such as the Viterbi algorithm. The result of the backend search is a sequence of recognized (i.e., the most likely) words.

A complex speech model comprises: a large library of stored atomic sounds, called senones; for each senone, a likelihood score delivered anew for each new frame of speech; a large library of context dependent phones (triphones), each represented as a linear sequence of senones; a large library of words (often called a lexicon), each represented as a linear sequence of (overlapping) triphones; and a language model which provides additional statistical information about the likelihood of word sequences. In applications that require extreme speed, the backend search stage 16 is one key computational bottleneck. As such, there is a need for a high-speed backend search stage for a speech recognition system.

SUMMARY OF THE DETAILED DESCRIPTION

The present invention relates to a hardware implemented backend search stage, or engine, for a speech recognition system. In one embodiment, the backend search engine includes a number of pipelined stages including a fetch stage, an updating stage which may be a Viterbi stage, a transition and prune stage, and a language model stage. Each active triphone of each active word is represented by a corresponding triphone model. By being pipelined, the stages of the backend search engine are enabled to simultaneously process different triphone models, thereby providing high-rate backend searching for the speech recognition system. In one embodiment, caches may be used to cache frequently and/or recently accessed triphone information utilized by the fetch stage, frequently and/or recently accessed triphone-to-senone mappings utilized by the updating stage, or both.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
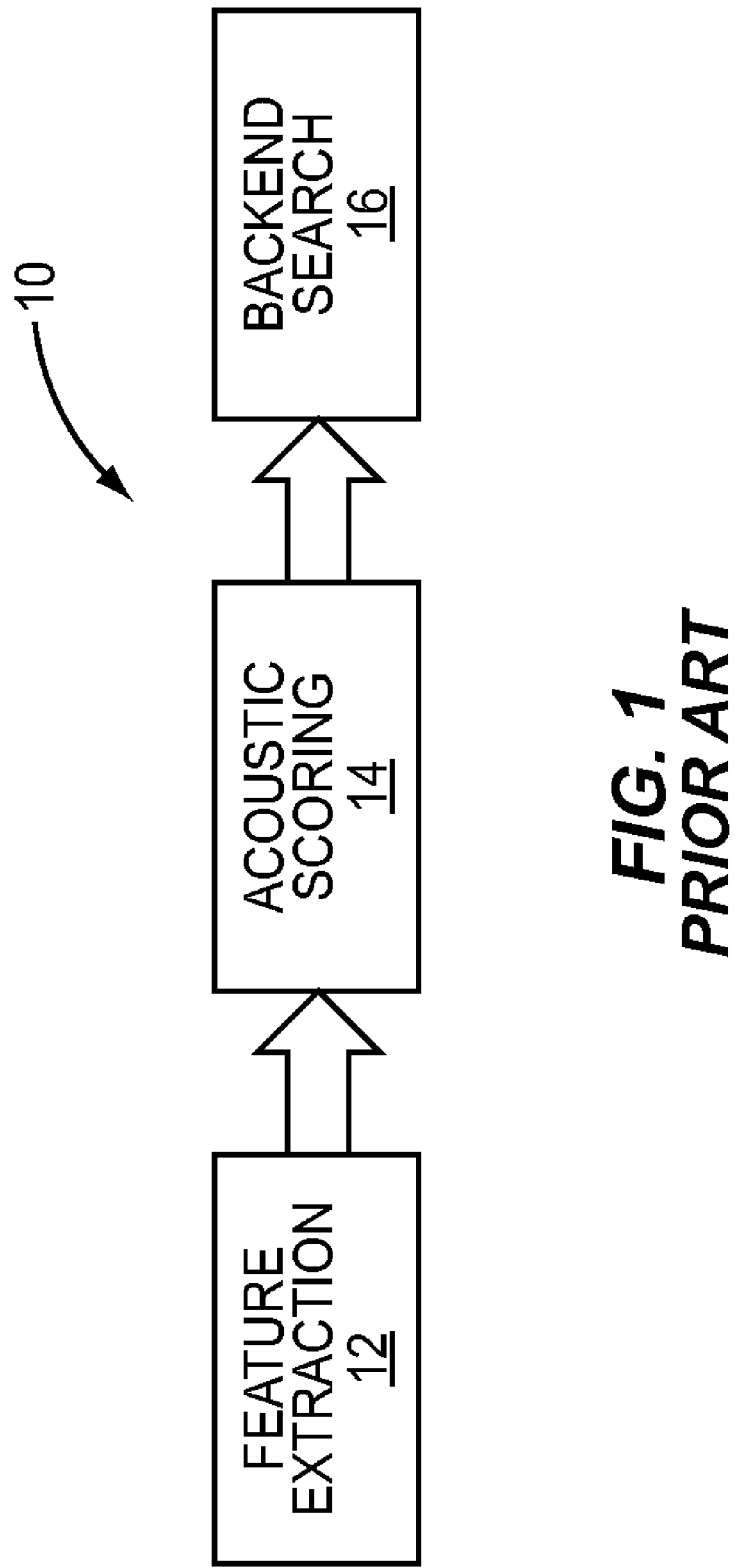
FIG. 1 illustrates decoding stages of a prior art speech recognition system.
Figure 2:
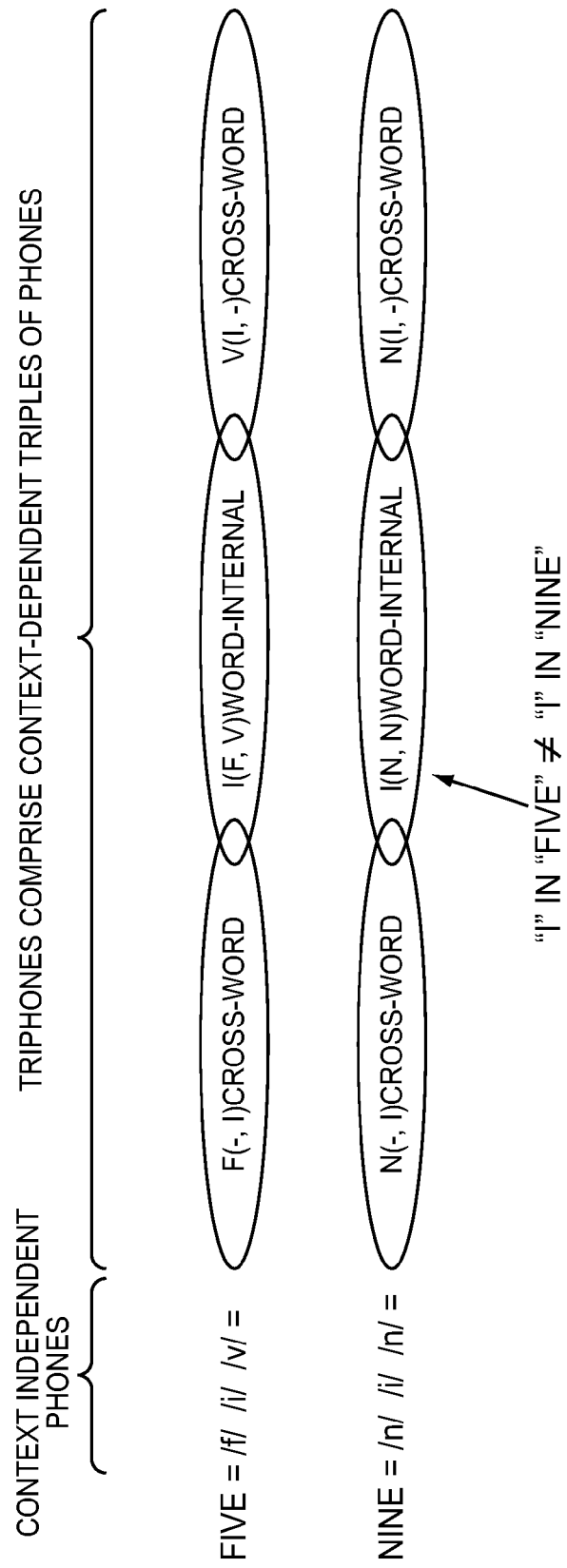
FIG. 2 illustrates context-dependent phones, or triphones, according to the prior art.
Figure 3:
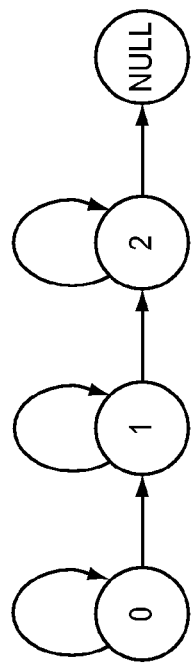
FIG. 3 illustrates a triphone model including a linear sequence of senones, or states, according to the prior art.
Figure 4:
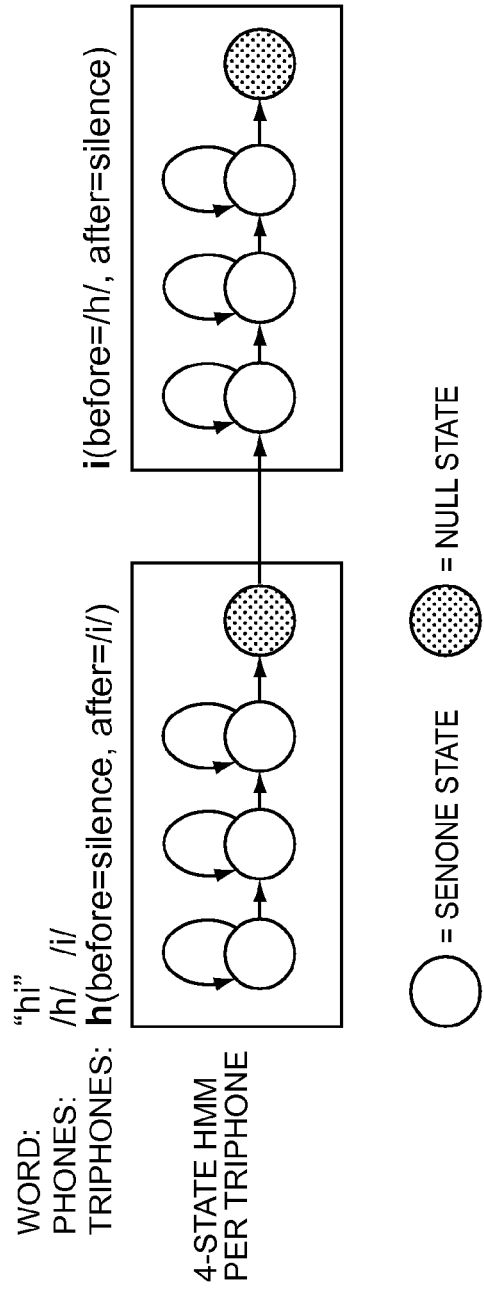
FIG. 4 illustrates the connection from senones, to triphones, to words according to the prior art.
Figure 5:
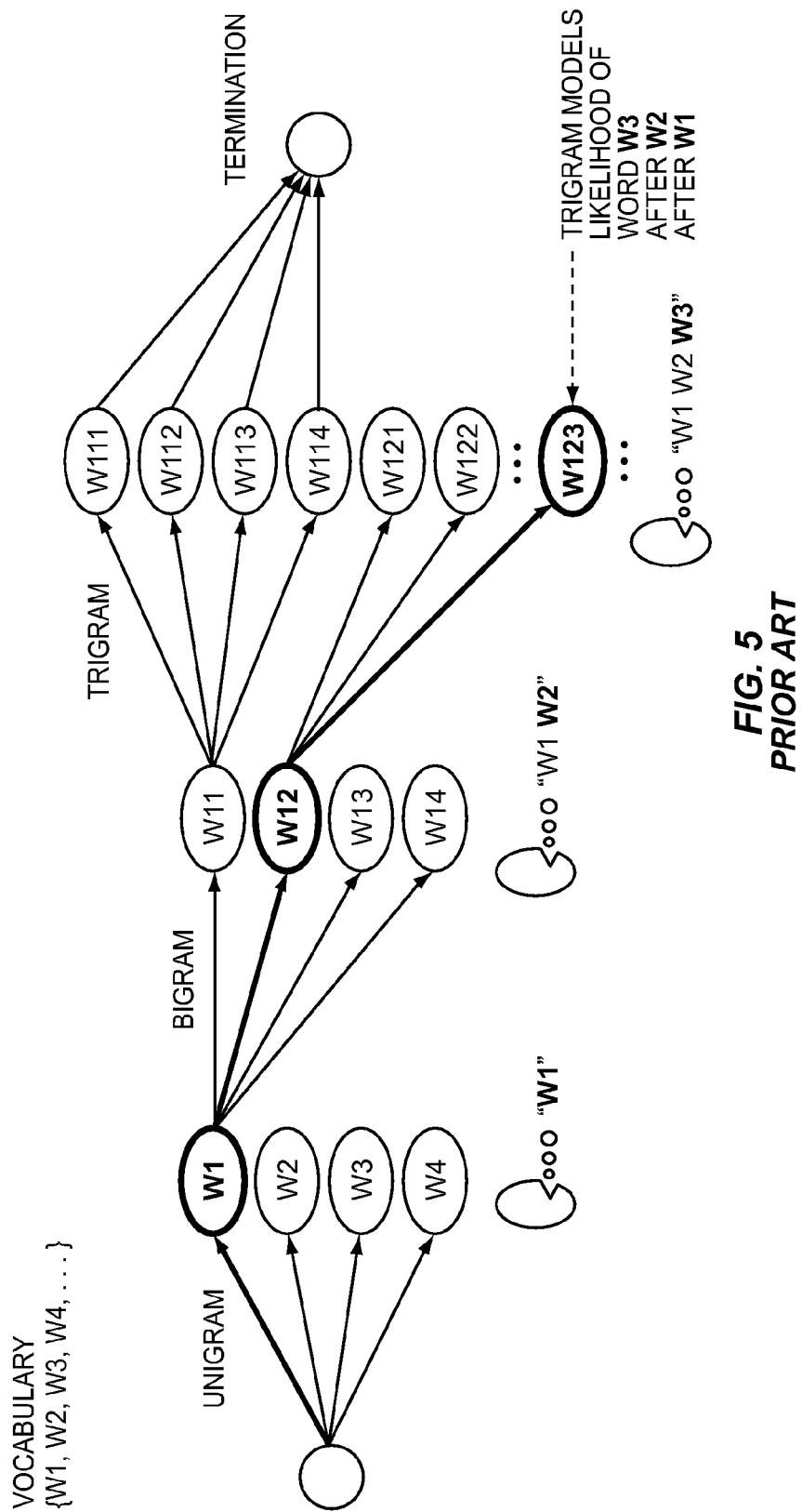
FIG. 5 illustrates an n-gram language model according to the prior art.
Figure 6:
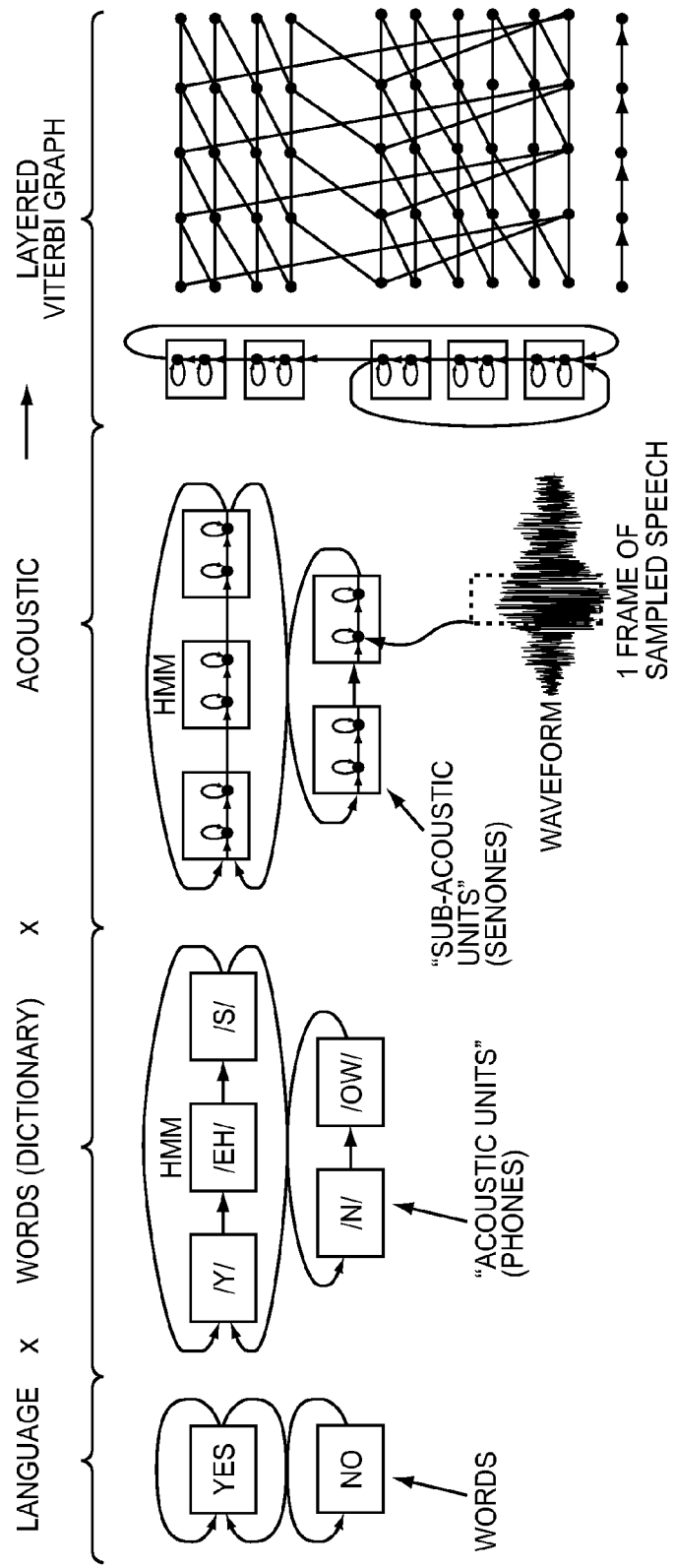
FIG. 6 graphically illustrates layers of the speech recognition process from senones to phones to words according to the prior art.
Figure 7:
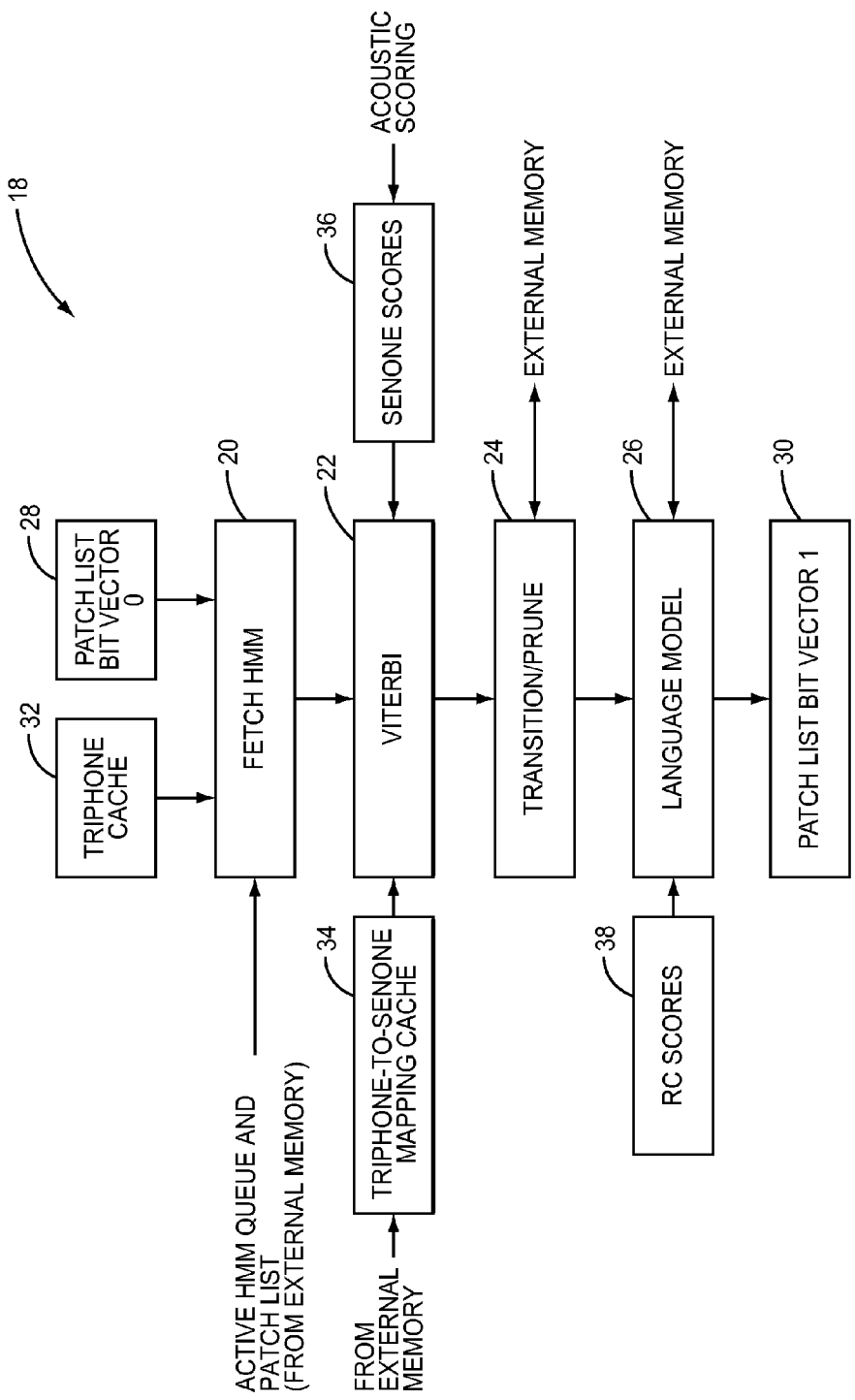
FIG. 7 illustrates a hardware implemented backend search stage, or engine, for a speech recognition system according to one embodiment of the present invention.

The present invention relates to a hardware implemented backend search engine for a speech recognition system. FIG. 7 illustrates a hardware implemented backend search engine 18 for a speech recognition system according to one embodiment of the present invention. In general, the backend search engine 18 operates to receive scores of atomic sounds or senones in an acoustic model for each frame of sampled speech. Based on the senone scores, the backend search engine 18 produces a string of most likely words.

Preferably, the backend search engine 18 is fabricated on a single integrated circuit (IC) such as, for example, an Application Specific Integrated Circuit (ASIC), a Field Programmable Gate Array (FPGA), or the like. However, in another embodiment, the backend search engine 18 may be fabricated on two or more ICs such as, for example, two or more ASICs, two or more FPGAs, or the like. Further, in this embodiment, the backend search engine 18 has access to one or more external, or off-chip, memory devices such as, for example, one or more Dynamic Random Access Memory (DRAM) devices. The one or more external memory devices are used to store data needed for the backend search such as, but not limited to, a vocabulary or dictionary defining all words that are recognizable by the backend search engine 18, triphones, senones, triphone-to-senone mappings, n-grams, an active triphone model queue, a patch list, or the like. In the preferred embodiment, triphones are modeled as Hidden Markov Models (HMMs) having a linear sequences of states, where each of the states corresponds to a senone. As such, the active triphone model queue is hereinafter referred to as an active HMM queue.

In general, the backend search engine 18 includes a fetch HMM stage 20, an updating or Viterbi stage 22, a transition and prune stage 24, and a language model stage 26 preferably operating in a pipelined manner. Note that, in this embodiment, a Viterbi algorithm is used to update HMMs based on corresponding senone scores. As such, the updating stage 22 is referred to herein as a Viterbi stage 22. However, other algorithms may be used to update the HMMs based on the corresponding senone scores, as will be apparent to one of ordinary skill in the art upon reading this disclosure. In addition, one or more internal memory units, or on-chip memory units, operate to store two patch list bit vectors 28 and 30, a triphone cache 32, a triphone-to-senone mapping cache 34, a senone score repository 36 including senone scores received from an acoustic scoring stage of the speech recognition system for a frame of sampled speech, and a right-context (RC) score repository 38.

As discussed below in detail, the patch list bit vector 28 includes a bit for each word in the vocabulary of the backend search engine 18. In this embodiment, bits in the patch list bit vector 28 that are set to "1" correspond to words identified by the language model stage 26 in an immediately preceding frame as words to be activated for the current frame. In other words, the bits in the patch list bit vector 28 that are set to "1" correspond to words that the language model stage 26 identified in the immediately preceding frame as words that are likely to be uttered next. The patch list bit vector 28 enables the fetch HMM stage 20 to quickly identify words that are to be activated and to quickly access corresponding entries for those words in a patch list stored in the external, or off-chip, memory when needed. In a similar manner, the patch list bit vector 30 also includes a bit for each word in the vocabulary of the backend search engine 18. In this embodiment, bits in the patch list bit vector 30 that are set to "1" correspond to words identified by the language model stage 26 in the current frame as words to be activated for a next frame. Entries for the words identified in the patch list bit vector 30 are stored in the patch list.

The triphone cache 32 operates to cache triphone information for recently accessed or frequently accessed triphones. The triphone-to-senone mapping cache 34 operates to cache triphone-to-senone mappings for recently used or frequently used triphones. The senone score repository 36 stores senone scores received from the acoustic scoring stage of the speech recognition system, where the senone scores include a senone score for each senone in an acoustic model utilized by the speech recognition system. Lastly, the RC scores in the RC score repository 38 are utilized by the language model stage 26 to score candidate words in order to determine whether the candidate words are likely to be uttered next.

Preferably, the stages 20-26 of the backend search engine 18 are pipelined such that the stages 20-26 are enabled to simultaneously process different HMMs. More specifically, in operation, the fetch HMM stage 20 fetches a first HMM. The first HMM is either an HMM from the active HMM queue or an HMM for a newly activated word identified in the patch list bit vector 28. Once the first HMM is fetched, the fetch HMM stage 20 outputs the first HMM to the Viterbi stage 22. While the first HMM is being processed by the Viterbi stage 22, the fetch HMM stage 20 fetches a second HMM. Again, the second HMM is either a next HMM from the active HMM queue or an HMM for a newly activated word identified in the patch list bit vector 28. When the first HMM has been updated by the Viterbi stage 22, the updated first HMM is output to the transition and prune stage 24, and the second HMM is output from the fetch HMM stage 20 to the Viterbi stage 22. While the updated first HMM is being processed by the transition and prune stage 24 and the second HMM is being updated by the Viterbi stage 22, the fetch HMM stage 20 fetches a third HMM. The language model stage 26 is triggered if completion of a word associated with the updated first HMM is detected by the transition and prune stage 24. If the word associated with the updated first HMM is completed, the language model stage 26 is triggered to identify words that are likely to be uttered next in light of the completed word and, if available, one or more previously completed words identified in a word history for the completed word. An n-gram model may be used. The words that are likely to be uttered next are identified as words to be activated. As such, corresponding bits are set in the patch list bit vector 30 for the next frame and corresponding entries are created in the patch list. The backend search engine 18 continues processing HMMs in this pipelined fashion until processing for the frame is complete. The process is repeated for each successive frame of sampled speech.

The preferred pipelined implementation of the backend search engine 18 of FIG. 7 provides a substantial increase in speed as compared to traditional backend search engines, which are typically implemented in software.

More specifically, in traditional backend search engines, each stage of the backend search engine processes each active HMM before processing proceeds to the next stage of the backend search engine. As such, a memory read operation and a memory write operation is required for each active HMM for each stage of the traditional backend search engine. In contrast, for the entire backend search process, the preferred pipelined implementation of the backend search engine 18 requires only one read operation for each active HMM and zero or one write operation for each active HMM depending on whether the active HMM is or is not pruned, as discussed below. By substantially reducing the number of memory reads and writes, the speed of the backend search engine 18 is much improved as compared to traditional backend search engines. The speed of the backend search engine 18 is further improved as a result of the triphone cache 32 and the triphone-to-senone mapping cache 34, which reduce the number of reads and writes to the external memory.

Figure 8:
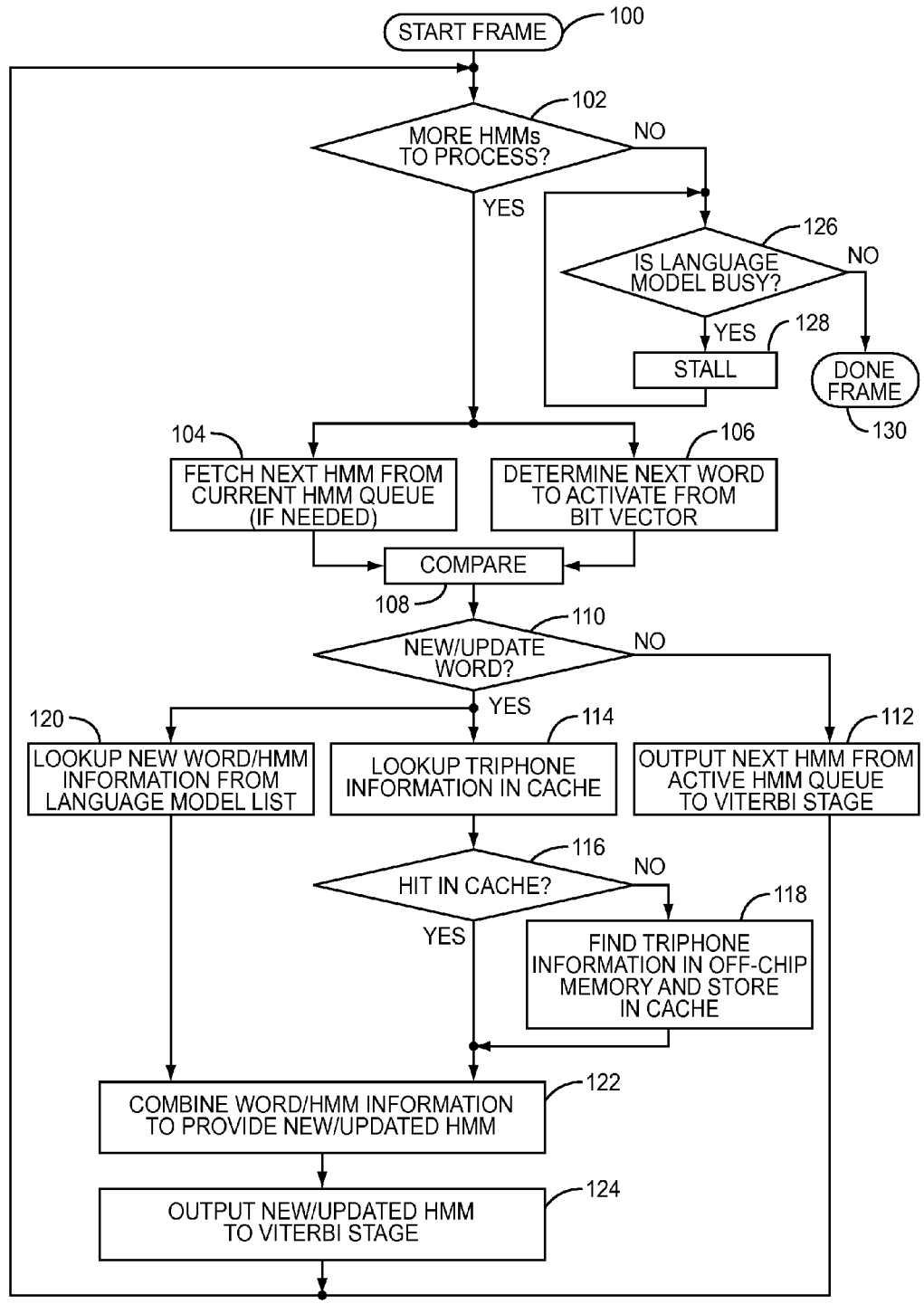
FIG. 8 is a flow chart illustrating the operation of the fetch stage of the hardware implemented backend search engine of FIG. 7 according to one embodiment of the present invention.

FIG. 8 is a flow chart illustrating the operation of the fetch HMM stage 20 of the backend search engine 18 of FIG. 7 according to one embodiment of the present invention. In general, the fetch HMM stage 20 operates to merge the active HMM queue and HMMs for newly activated words identified in the patch list bit vector 28. Specifically, in this embodiment, processing for a frame of sampled speech begins (step 100). The fetch HMM stage 20 determines whether there are any more HMMs to process (step 102). More specifically, the fetch HMM stage 20 determines whether there are any more HMMs in the active HMM queue to process for the frame or any more words identified in the patch list bit vector 28 to be activated. If so, the fetch HMM stage 20 fetches a next HMM from the active HMM queue, which in this embodiment is stored in external, or off-chip, memory (step 104). Note that if the next HMM from the active HMM queue was previously fetched and not output to the Viterbi stage 22 due to insertion of an HMM for a newly activated word, then the fetch HMM stage 20 may retain the next HMM from the active HMM queue in internal, or on-chip, memory and therefore not need to fetch the next HMM from the active HMM queue. In addition to fetching the next HMM from the active HMM queue, the fetch HMM stage 20 processes the patch list bit vector 28 to determine a next word to activate (step 106).

In this embodiment, each word in the vocabulary of the speech recognition system is assigned a word number corresponding to the word's location in an alphabetically sorted list of the words in the vocabulary of the speech recognition system. Therefore, the first word in the vocabulary may be assigned a word number of 0, the second word in the vocabulary may be assigned a word number of 1, and so on. Further, the HMMs in the active HMM queue are arranged alphabetically and by phone position such that any HMMs for word 0 appear first in the active HMM queue, any HMMs for word 1 appear next in the active HMM queue, and so on. In a similar manner, the patch list bit vector 28 is maintained such that bit 0 corresponds to word 0, bit 1 corresponds to word 1, and so on. In other words, the active HMM queue is maintained such that the HMMs are arranged alphabetically by word, and the patch list bit vector 28 is maintained such that the bits are maintained for an alphabetical list of words.

The fetch HMM stage 20 then compares the next HMM from the active HMM queue and the next word to activate from the patch list bit vector 28 to determine whether to output the next HMM from the active HMM queue, output a new HMM for the next word to activate identified by the patch list bit vector 28, or update the next HMM from the active HMM queue based on the next word to activate identified by the patch list bit vector 28 and output the updated HMM (step 108). In this embodiment, if a word number for the next HMM from the active HMM queue is less than a word number of the next word to activate identified by the patch list bit vector 28 (i.e., the word for the next HMM from the active HMM queue alphabetically precedes the next word to be activated identified by the patch list bit vector 28), then a determination is made to output the next HMM from the active HMM queue to the Viterbi stage 22. If the word number for the next HMM from the active HMM queue is greater than the word number of the next word to activate identified by the patch list bit vector 28 (i.e., the word for the next HMM from the active HMM queue alphabetically follows the next word to be activated identified by the patch list bit vector 28), then a determination is made to output a new HMM for the next word to activate. If the word number for the next HMM from the active HMM queue is equal to the word number of the next word to activate identified by the patch list bit vector 28 (i.e., the word for the next HMM from the active HMM queue is the same as the next word to be activated identified by the patch list bit vector 28), then a determination is made to update the next HMM from the active HMM queue if the next HMM is a first triphone of the word. If the next HMM is not the first triphone in the word, then a new HMM is created.

If the fetch HMM stage 20 determines that a new HMM or updated HMM is not to be output (i.e., determines that the next HMM from the active HMM queue is to be output) (step 110), the fetch HMM stage 20 outputs the next HMM from the active HMM queue to the Viterbi stage 22 (step 112). The process then returns to step 102 and is repeated. If the fetch HMM stage 20 determines that a new HMM for the next word to activate is to be output or that the next HMM from the active HMM queue is to be updated, then the fetch HMM stage 20 performs a lookup of triphone information for the new or updated HMM in the triphone cache 32 (step 114). The triphone lookup is performed using a triphone pointer and a left context phone from the patch list entry for the word being activated. The triphone information identifies a base phone for the triphone represented by the new or updated HMM, a left context phone which is a phone preceding the base phone for the triphone represented by the new or updated HMM, and a right context phone which is a phone following the base phone in the triphone represented by the new or updated HMM. For example, for the /i/ phone in the word "five," the triphone is written as I(F,V) where /i/ is the base phone, /f/ is the left context phone, and /v/ is the right context phone. If there is a hit in the triphone cache 32 (step 116), the triphone information is obtained from the triphone cache 32. If there is not a hit in the triphone cache 32, then the triphone information is obtained, in this embodiment, from the external, or off-chip, memory and stored in the triphone cache 32 (step 118).

In addition to performing a lookup for the triphone information for the new or updated HMM, the fetch HMM stage 20 performs a lookup for the needed information for the new or updated HMM from the corresponding entry in the patch list (step 120). More specifically, the patch list bit vector 28 is utilized to determine a word number or index for the word to be activated. Using the word number or index, an entry for the word is obtained from the patch list stored in the external memory. The entry for the word in that patch list includes a score computed by the language model stage 26, a word history identifying a previous word in a word history for the word being activated, a word length, or the like.

At this point, the triphone information obtained in steps 114-118 and the needed information for the new or updated HMM obtained in step 120 are combined to provide the new or updated HMM (step 122). More specifically, if a new HMM is being created for the newly activated word, the score from the corresponding patch list entry is stored as a state score for a first stage of the new HMM, the word history from the corresponding patch list entry is stored as a word history for the HMM, the word length from the corresponding patch list entry is stored as the word length for the HMM, and the triphone information defining the triphone represented by the HMM obtained in steps 114-118 is stored in the HMM. If the next HMM from the active HMM queue is being updated, the score from the patch list entry for the word is compared to the current state score for a first state of the next HMM from the active HMM queue, which is a first HMM of the word. If the score from the patch list entry is greater than the current score of the first state of the HMM, then the HMM is updated with the data from the patch list entry and the triphone information obtained in steps 114-118 based on information in the patch list entry. Otherwise, the HMM is not updated. The fetch HMM stage 20 then outputs the new or updated HMM to the Viterbi stage 22 (step 124), and the process then returns to step 102 and is repeated.

Returning to step 102, once there are no more HMMs in the active HMM queue to process for the frame and no more words to activate identified in the patch list bit vector 28, the fetch HMM stage 20 determines whether the language model stage 26 is busy (step 126). If so, the fetch HMM stage 20 stalls or waits until the language model stage 26 is no longer busy (step 128). At that point, processing for the frame is complete (step 130). The process of steps 100-130 is repeated for each frame of sampled speech.

Figure 9:
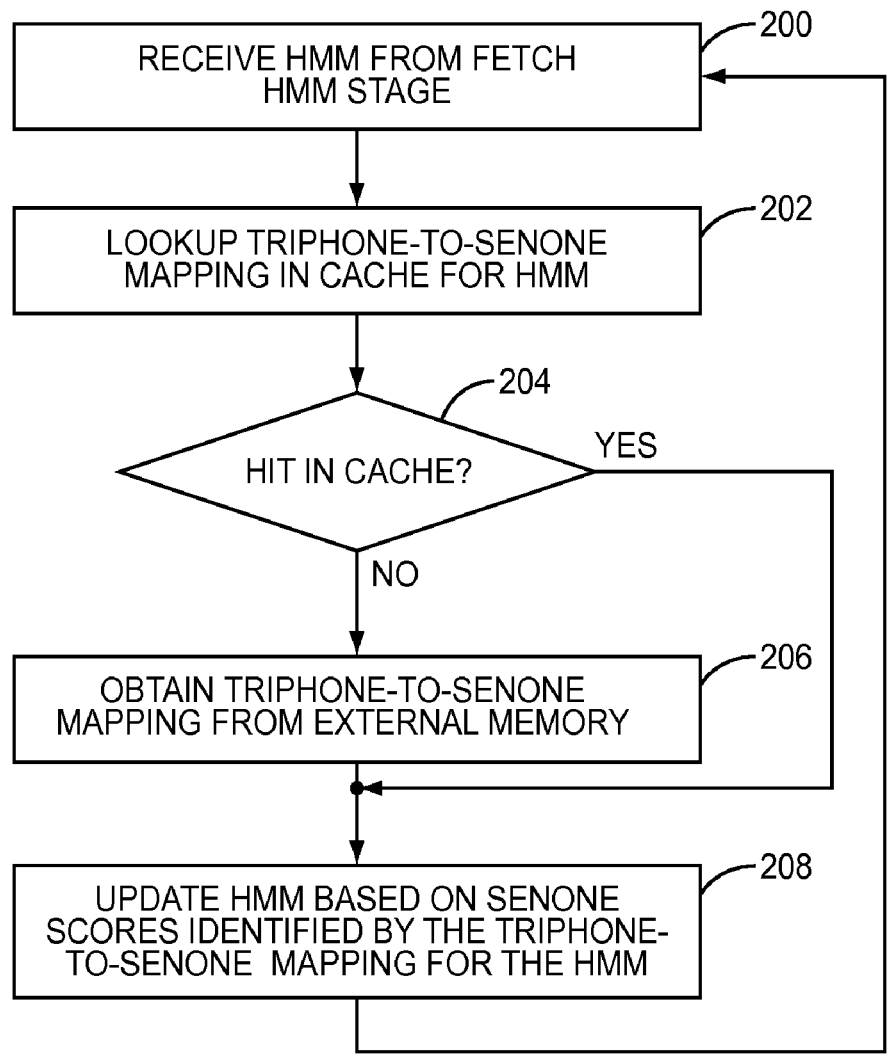
FIG. 9 is a flow chart illustrating the operation of the Viterbi or updating stage of the hardware implemented backend search engine of FIG. 7 according to one embodiment of the present invention.

FIG. 9 is a flow chart illustrating the operation of the Viterbi stage 22 of FIG. 7 according to one embodiment of the present invention. First, the Viterbi stage 22 receives an HMM from the fetch HMM stage 20 (step 200). The Viterbi stage 22 then performs a lookup for a triphone-to-senone mapping for the triphone represented by the HMM in the triphone-to-senone mapping cache 34 (step 202). If there is a hit in the triphone-to-senone mapping cache 34 (step 204), then the triphone-to-senone mapping for the triphone represented by the HMM is obtained from the triphone-to-senone mapping cache 34. If there is not a hit in the triphone-to-senone mapping cache 34, then the triphone-to-senone mapping for the triphone represented by the HMM is obtained from external, or off-chip, memory and stored in the triphone-to-senone mapping cache 34 (step 206). For each state of the HMM, the triphone-to-senone mapping for the triphone provides a corresponding senone index.

At this point, the Viterbi stage 22 updates the HMM, or more specifically state scores for the states of the HMM using a Viterbi algorithm (step 208). More specifically, using the senone indices from the triphone-to-senone mapping for the triphone, the Viterbi stage 22 obtains the senone scores for the senones corresponding to the states of the HMM from the senone score repository 36. The Viterbi stage 22 then updates the state scores for the states of the HMM based on the corresponding senone scores. Again, while a Viterbi algorithm is used to updated the HMM in this embodiment, the present invention is not limited thereto. Other algorithms for updating the HMM based on the corresponding senone scores will be apparent to those skilled in the art upon reading this disclosure.

Figure 10:
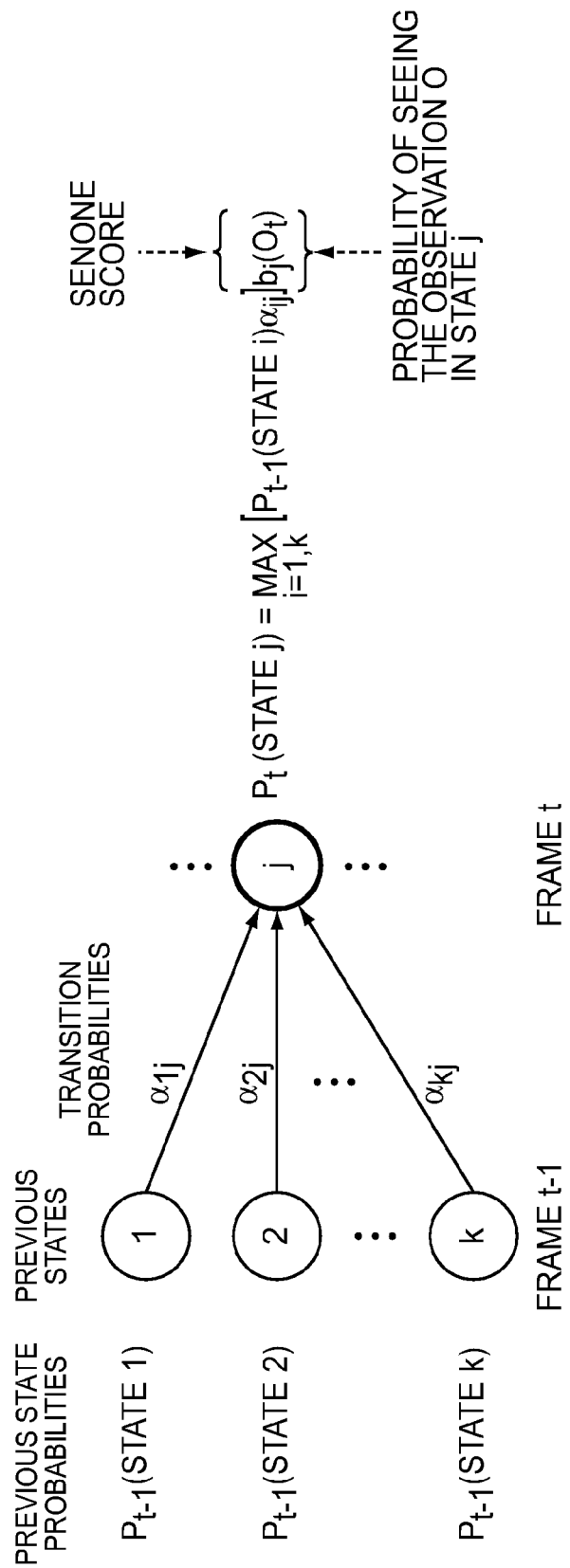
FIG. 10 illustrates a Viterbi scoring process for a single state of a triphone model according to one embodiment of the present invention.

FIG. 10 graphically illustrates a Viterbi algorithm for updating the state scores for the states of an HMM based on the corresponding senone scores according to one embodiment of the present invention. As illustrated, the state score for state j is represented as a probability or log(probability) defined by the equation:

$$P_t(\text{state}_j) = \max_{i=1,k}[P_{t-1}(\text{state}_i)\alpha_{ij}]b_j(O_t),$$

where $P_t(\text{state}_j)$ is a probability, or state score, for state j of the HMM at time t, $P_{t-1}(\text{state}_i)$ is a probability, or state score, for state i of the HMM at time t−1, $\alpha_{ij}$ is a transition probability for a transition from state i to state j, and k is a number of states that transition to state j. The term $b_j(O_t)$ is a probability of seeing the observation O in state j. The term $b_j(O_t)$ corresponds to the senone score for the senone represented by state j in the HMM. Thus, in order to update the HMM, for each state, the state score is computed based on the previous state score for that state, the state scores for states that transition to that state, and the transition probabilities for transitioning to that state.

Figure 11:
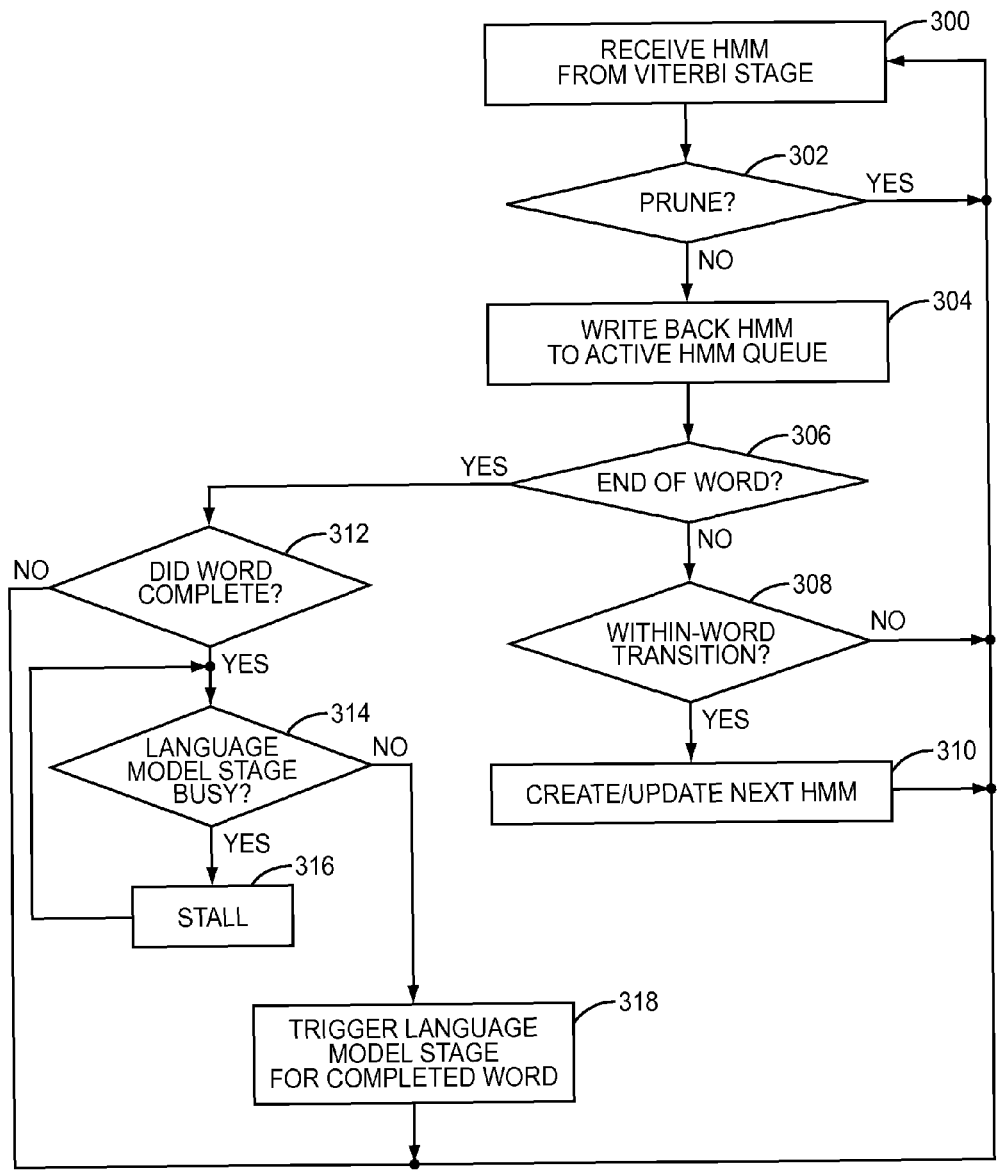
FIG. 11 is a flow chart illustrating the operation of the transition and prune stage of the hardware implemented backend search engine of FIG. 7 according to one embodiment of the present invention.

FIG. 11 is a flow chart illustrating the operation of the transition and prune stage 24 of FIG. 7 according to one embodiment of the present invention. First, the transition and prune stage 24 receives a HMM from the Viterbi stage 22 (step 300). As discussed above, the HMM from the Viterbi stage 22 has been updated based on corresponding senone scores. Next, the transition and prune stage 24 determines whether the HMM is to be pruned (step 302). More specifically, in one embodiment, the transition and prune stage 24 compares the state scores for the HMM to a pruning threshold. If all of the state scores are less than the pruning threshold, then a determination is made to prune the HMM, and the process returns to step 300 without writing the HMM back to the active HMM queue. If one or more of the state scores is greater than the pruning threshold, a determination is made not to prune the HMM. As such, the transition and pruning stage 24 writes the HMM back to the active HMM queue (step 304). Note that at this point, the state scores of the HMM have been updated by the Viterbi stage 22 such that the HMM written back to the active HMM queue is the updated HMM.

In addition, the transition and prune stage 24 determines whether an end of the current word has been reached (step 306). In other words, the transition and prune stage 24 determines whether the HMM is a last HMM of the current word. If not, the transition and prune stage 24 determines whether there is a within-word transition (step 308). Specifically, the transition and prune stage 24 compares the state score of a last state of the HMM to a within-word transition threshold. If the state score of the last state of the HMM is less than the within-word transition threshold, then the process returns to step 300 and is repeated. If the state score of the last state of the HMM is greater than the within-word transition threshold, then the transition and prune stage 24 creates or updates the next HMM in the word (step 310). More specifically, if the next HMM in the word is already active, then the transition and prune stage 24 updates the state score of the first state of the next HMM with the state score of the last state of the current HMM. If the next HMM in the word is not already active, then the transition and prune stage 24 creates the next HMM for the word and sets the state score of the first state of the next HMM for the word equal to the state score of the last state of the current HMM. The next HMM of the word, whether updated or new, is written back to the active HMM queue. At this point, the process returns to step 300 and is repeated.

Returning to step 306, if the end of the current word has been reached (i.e., the current HMM is the last state of the current word), then the transition and prune stage 24 determines whether the current word completed (step 312). Specifically, the transition and prune stage 24 determines whether the state score for the last state of the HMM is greater than a word-to-word transition threshold. If not, the process returns to step 300 and is repeated. If the word has completed, the transition and prune stage 24 determines whether the language model stage 26 is busy (step 314). If so, the transition and prune stage 24 stalls, or waits, until the language model stage 26 is no longer busy (step 316). If the language model stage 26 is not busy or when the language model stage 26 is no longer busy, the transition and prune stage 24 triggers the language model stage 26 for the completed word (step 318). The process then returns to step 300 and is repeated.

Figure 12:
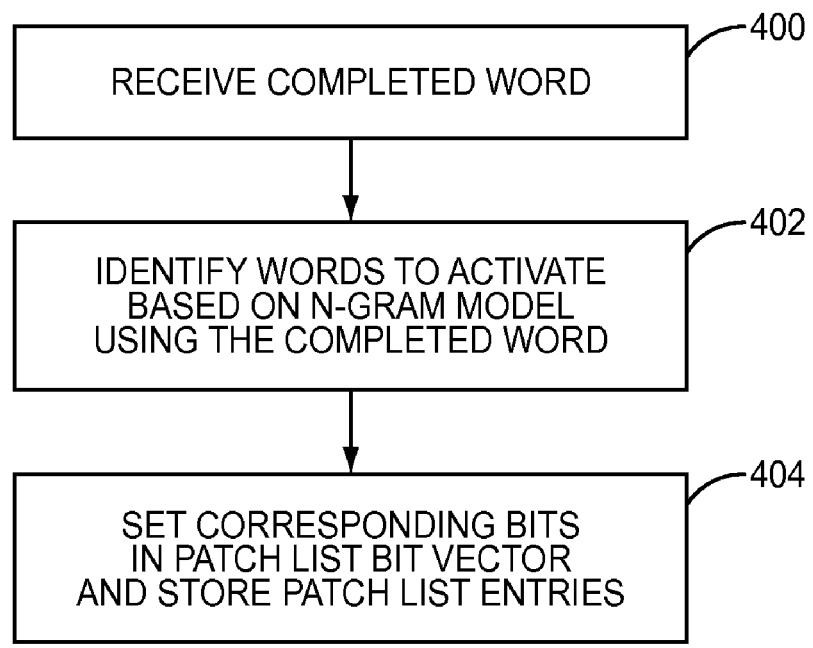
FIG. 12 is a flow chart illustrating the operation of the language model stage of the hardware implemented backend search engine of FIG. 7 according to one embodiment of the present invention.

FIG. 12 is a flow chart illustrating the operation of the language model stage 26 of FIG. 7 according to one embodiment of the present invention. First, the language model stage 26 receives a completed word from the transition and prune stage 24 (step 400). Then, in this embodiment, an n-gram model is used to identify words to activate for the next frame of sampled speech (step 402). In one embodiment, a trigram model is used such that, at most, a two-word history of the completed word is utilized to identify words that are most likely to follow. Using the trigram model, trigram word candidates may be identified based on a two-word history of the completed word and bigram word candidates may be identified based on a one-word history of the completed word. Each of the word candidates is scored based on a predefined score for the n-gram word candidate and an RC score from the RC score repository 38, which is a score of a last state of a last HMM of the completed word. The n-gram word candidates scored above a threshold are the words that are most likely to follow the completed word and are therefore identified as words to activate for the next frame. The language model stage 26 then sets bits in the patch list bit vector 30 for the next frame of sampled speech that correspond to the words to be activated and stores corresponding entries in the patch list which, in this embodiment, is stored in the external, or off-chip, memory (step 404). In one embodiment, the patch list entry for each word to be activated includes the word number or word ID for the word, the score determined for the word, a word history of the word, a triphone pointer to be used to obtain the triphone information when creating or updating an HMM for the word, a left context for the first triphone of the word, and a word length of the word (i.e., a number of triphones in the word). The patch list entry for each word may include additional or alternative data depending on the particular implementation.

Note that the flow charts of FIGS. 8, 9, 11, and 12 are exemplary. Variations will be apparent to one of ordinary skill in the art. While the stages 20-26 of the backend search engine 18 are preferably pipelined, sub-stages or sub-processes of each of the stages 20-26 may or may not be pipelined. For instance, in the embodiments of the stages 20-26 of the backend search engine 18 illustrated in FIGS. 8, 9, 11, and 12, sub-stages or sub-processes of the stages 20-26 are not pipelined. However, in an alternative embodiment, each of one or more of the stages 20-26 of the backend search engine 18 may be implemented as a number of pipelined sub-stages. For example, the fetch HMM stage 20 may be implemented as three pipelined sub-stages. A first sub-stage may retrieve the next active HMM from the active HMM queue and determines the next word to be activated using the patch list bit vector 28. A second sub-stage may determine whether to output the next active HMM from the active HMM queue, a new HMM for a first triphone of the next word to activate, or an updated version of the next active HMM. A third sub-stage may then create a new HMM or update the next HMM if needed.

In a similar manner, the Viterbi stage 22 may be implemented as a number of pipelined sub-stages. A first sub-stage may obtain the triphone-to-senone mapping for the triphone represented by the current HMM, a second sub-stage may then obtain the corresponding senone scores using the triphone-to-senone mapping, and a third sub-stage may then update the state scores of the current HMM based on the corresponding senone scores. In a similar manner, the transition and prune stage 24 and the language model stage 26 may each be implemented as a number of pipelined sub-stages.

Figure 13:
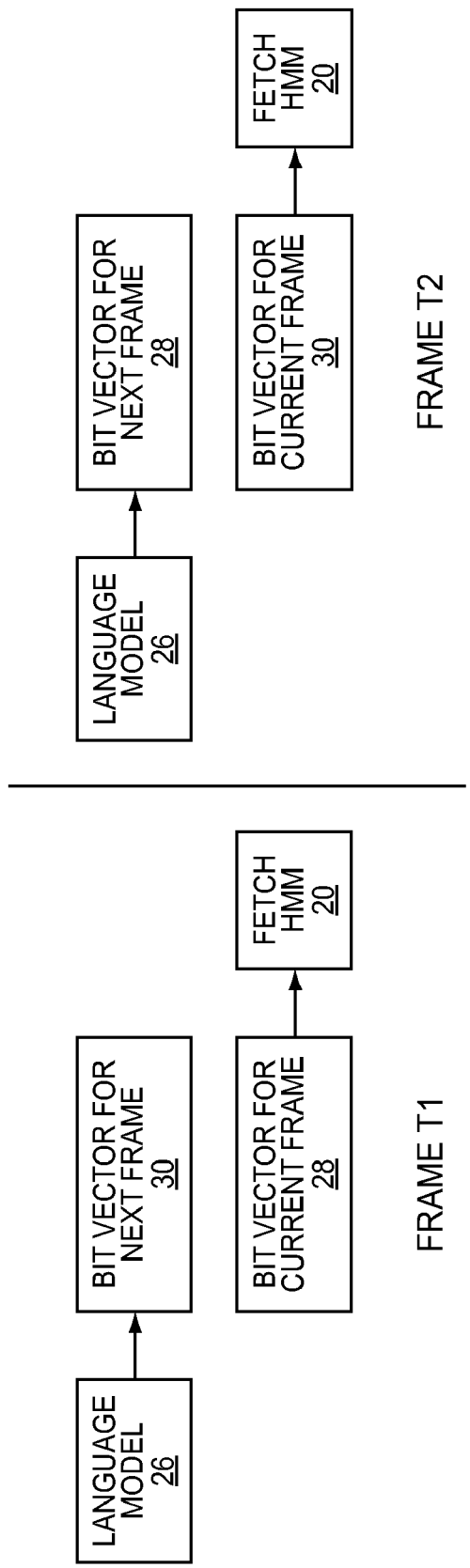
FIG. 13 illustrates toggling of two patch list bit vectors between frames according to one embodiment of the present invention.

FIG. 13 illustrates a feature wherein the patch list bit vectors 28 and 30 are toggled from one frame to another. More specifically, during a frame T1, the patch list bit vector 28 identifies words to be activated during the frame T1, and the patch list bit vector 30 is used by the language model stage 26 to signify words to be activated in a next frame T2. Then, for the frame T2, the patch list bit vectors 28 and 30 are toggled such that the fetch HMM stage 20 utilizes the patch list bit vector 30 to determine words that are to be activated for the frame T2, and the patch list bit vector 28 is used by the language model stage 26 to signify words to be activated in the next frame.

Figure 14:
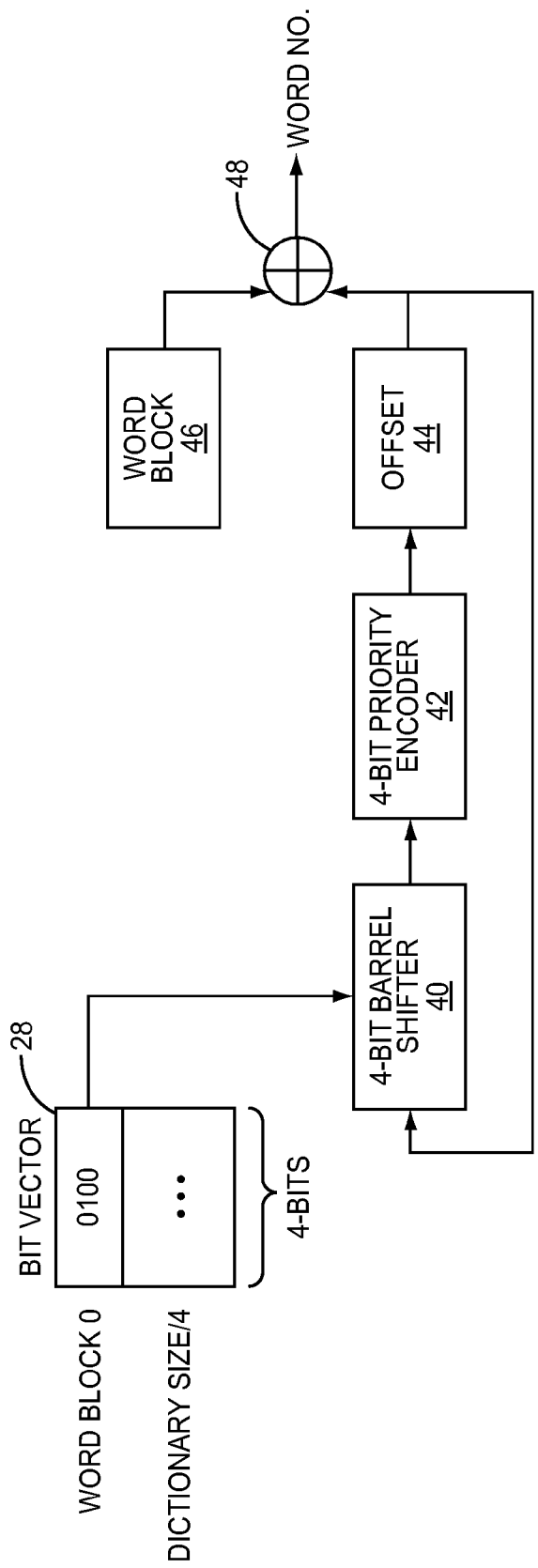
FIG. 14 illustrates the operation of the fetch stage to identify words to activate in a current frame utilizing a patch list bit vector according to one embodiment of the present invention.

FIG. 14 illustrates an exemplary circuit that may be used by the fetch HMM stage 20 to identify words to activate using the patch list bit vector 28 according to one embodiment of the present invention. First, in this embodiment, the patch list bit vector 28 includes a number of word blocks, each including four bits. However, the present invention is not limited thereto. For instance, the word blocks in the patch list bit vector 28 may alternatively include 16 bits. Each bit in each word block corresponds to a different word in the vocabulary. Therefore, bit 0 in word block 0 corresponds to word 0, bit 1 in word block 0 corresponds to word 1, bit 2 in word block 0 corresponds to word 2, bit 3 in word block 0 corresponds to word 3, bit 0 in word block 1 corresponds to word 4, and so on.

A 4-bit barrel shifter 40 obtains, in this example, word block 0 from the patch list bit vector 28, and provides word block 0 to a 4-bit priority encoder 42. The output of the 4-bit priority encoder 42 is an offset 44, which in this example is 0, 1, 2, or 3 depending on the values of the bits stored in word block 0.

Specifically, if bit 0 is set in word block 0, then the offset 44 is 0 regardless of the values for bits 1, 2, and 3. If bit 0 is not set but bit 1 is set, then the offset 44 is 1 regardless of the values for bits 2 and 3. If bits 0 and 1 are not set but bit 2 is set, then the offset 44 is 2 regardless of the value of bit 3. Finally, if bits 0, 1, and 2 are not set but bit 3 is set, then the offset 44 is 3. Note, however, that if none of the bits in word block 0 are set to a value of "1," the fetch HMM stage 20 recognizes that none of the bits in word block 0 are set and therefore proceeds to the next word block. The offset 44 and a word block number 46 of the word block being processed, which in this example is word block 0, are combined by a combiner 48 to provide the word number, or index, to the word to be activated in the patch list.

It is expected that each word block may include more than one bit that has been set to "1." For example, if both bit 0 and bit 1 in word block 0 are set to "1," the offset 44 is initially 0, as discussed above. Feedback is provided to the 4-bit barrel shifter 40 to then switch bit 0 from "1" to "0." The offset 44 then switches to 1 such that the word number for the next word to activate is determined. Once there are no more bits set to "1" in the 4-bit barrel shifter 40, processing proceeds to the next word block.

Figure 15:
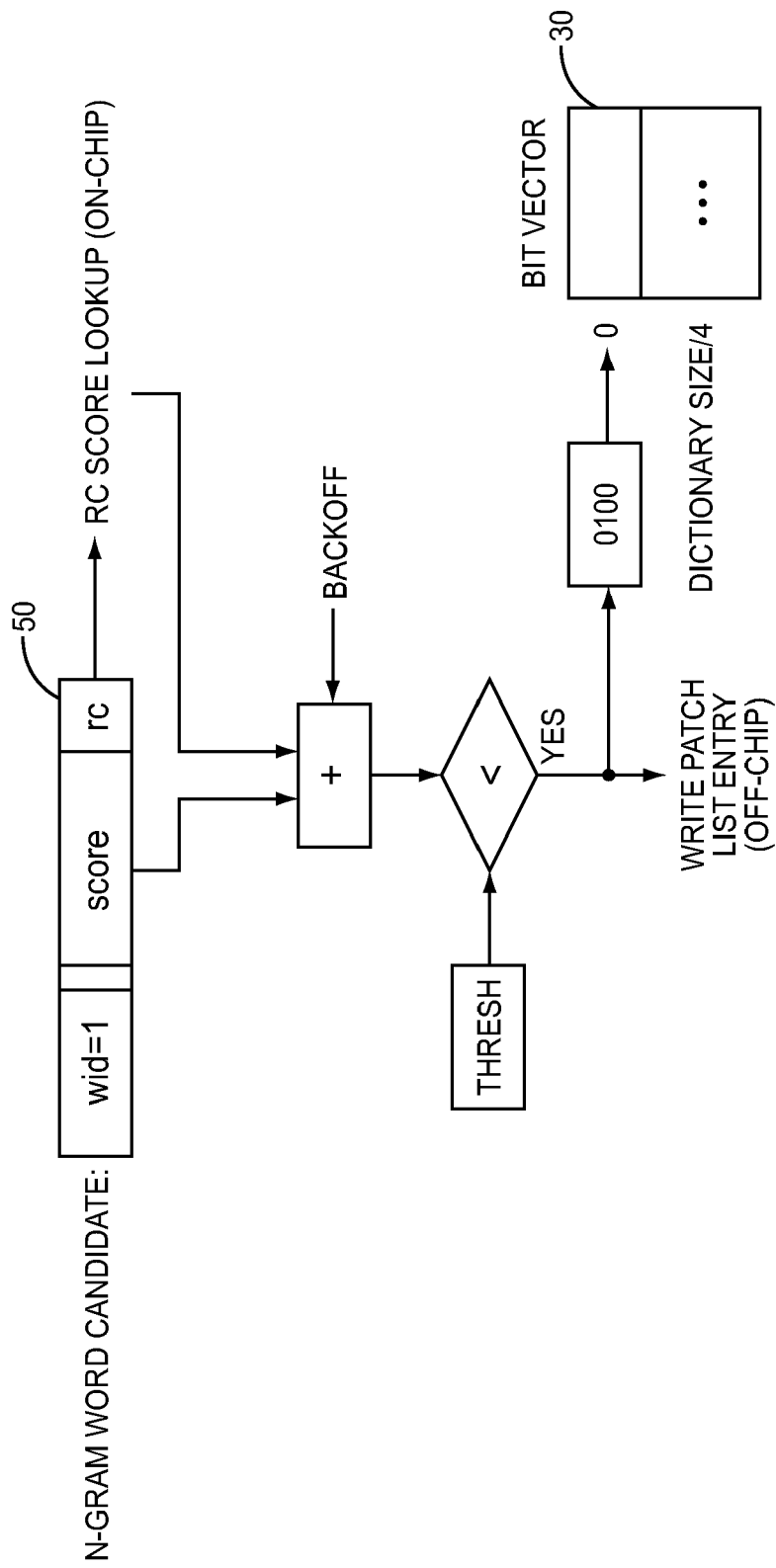
FIG. 15 illustrates the operation of the language model stage to set bits in a patch list bit vector corresponding to words to activate in a next frame according to one embodiment of the present invention.

FIG. 15 illustrates the operation of the language model stage 26 to add an n-gram word candidate to the patch list and to set the corresponding bit in the patch list bit vector 30 according to one embodiment of the present invention. Specifically, for a completed word, the language model stage 26 uses an n-gram model to identify a number of n-gram word candidates based on a word history of the completed word. A data structure 50 for one such n-gram word candidate is illustrated in FIG. 15. The data structure 50 for the n-gram word candidate includes a word number or word ID of the corresponding word in the vocabulary, a score for the n-gram word candidate, and an RC index. The score is a probability or log(probability) assigned to the n-gram word candidate that corresponds to the likelihood of the n-gram. For instance, if the n-gram is the trigram you/how, are where "you" is the word identified by the word ID for the trigram and the words "how" and "are" are the previous two words in the trigram, then the score corresponds to the probability or log(probability) that the word "you" will be uttered if the two previous words are "how" and "are." The RC index is an index of a corresponding RC score in the RC score repository 38. The RC score is the state score of the last state of the last HMM of the completed word.

In order to determine whether the n-gram word candidate is to be activated for the next frame and therefore should be added to the patch list, the language model stage 26 combines the score of the n-gram, the RC score, and, in this embodiment, a backoff. If the n-gram analysis is a trigram analysis, then the backoff value is at a minimum backoff value when the n-gram candidate is a trigram, an intermediate value when the n-gram candidate is a bigram, and a maximum value when the n-gram candidate is a unigram. The combined score resulting from the combination of the score of the n-gram, the RC score, and the backoff is compared to a threshold. If the combined score is greater than a threshold, then the n-gram word candidate is identified as a word to be activated for the next frame. As such, the n-gram word candidate is written to the patch list and a corresponding bit in the patch list bit vector 30 is set.

Those skilled in the art will recognize improvements and modifications to the preferred embodiments of the present invention. All such improvements and modifications are considered within the scope of the concepts disclosed herein and the claims that follow.

What is claimed is:

1. A hardware implemented backend search engine for a speech recognition system comprising:
a fetch stage adapted to merge a first plurality of active triphone models and a second plurality of triphone models for words to be activated for a current frame of sampled speech to output a series of triphone models to be processed for the current frame;
an updating stage adapted to receive the series of triphone models to be processed for the current frame, update each triphone model of the series of triphone models based on senone scores received from an acoustic scoring stage of the speech recognition system to provide a series of updated triphone models, and output the series of updated triphone models;
a transition and prune stage adapted to process the series of updated triphone models; and
a language model stage adapted to, for each completed word of one or more completed words detected by the transition and prune stage for the current frame, identify one or more words that are likely to be uttered next based on the completed word as words to be activated in a next frame of sampled speech;
wherein the fetch stage, the updating stage, the transition and prune stage, and the language model stage are configured in a pipeline architecture and implemented on a single application specific integrated circuit such that the fetch stage, the updating stage, the transition and prune stage, and the language model stage are enabled to simultaneously process different triphone models;
and wherein the first plurality of active triphone models are stored in an active queue arranged by word, and the words to be activated in the current frame are stored in a patch list arranged by word, and the fetch stage is adapted to:
retrieve a next active triphone model from the active queue;
identify a next word to be activated from the patch list;
output the next active triphone model retrieved from the active queue if the next active triphone model retrieved from the active queue represents a triphone of a word that precedes the next word to be activated; and
output a new triphone model for a first triphone of the next word to be activated if the next active triphone model retrieved from the active queue represents a triphone of a word that follows the next word to be activated.

2. The backend search engine of claim 1 wherein the words to be activated for the current frame are words identified by the language model stage in a preceding frame of sampled speech.

3. The backend search engine of claim 1
wherein if the next active triphone model retrieved from the active queue represents a triphone of a word that is a same word as the next word to be activated, the fetch stage is further adapted to:
if the next active triphone model does not represent a first triphone of the word, output a new triphone model representing a first triphone of the next word to be activated; and
if the next active triphone model represents the first triphone in the word, update the next triphone model based on data from an entry in the patch list for the next word to be activated to output an updated next triphone model.

4. The backend search engine of claim 3 wherein in order to output the new triphone model for the first triphone of the next word to be activated, the fetch stage is further adapted to:
retrieve triphone information describing the first triphone of the next word to be activated;
retrieve the data from the entry in the patch list for the next word to be activated;
combine the triphone information and the data from the entry in the patch list to provide the new triphone model for the first triphone of the next word to be activated; and
output the new triphone model.

5. The backend search engine of claim 4 wherein in order to retrieve the triphone information, the fetch stage is further adapted to:
perform a lookup for the triphone information for the first triphone of the next word to be activated in a triphone information cache implemented in internal memory of the single application specific integrated circuit such that the triphone information is obtained from the triphone information cache if the triphone information is stored in the triphone information cache; and
if the triphone information for the first triphone of the next word to be activated is not stored in the triphone information cache, retrieve the triphone information from external memory.

6. The backend search engine of claim 3
wherein in order to update the next active triphone model, the fetch stage is further adapted to:
retrieve triphone information describing the first triphone of the next word to be activated;
retrieve the data from the entry in the patch list for the next word to be activated; and combine the triphone information, the data from the entry in the patch list, and data in the next active triphone model to provide the updated next triphone model.

7. The backend search engine of claim 6 wherein in order to retrieve the triphone information, the fetch stage is further adapted to:
perform a lookup for the triphone information for the first triphone of the next word to be activated in a triphone information cache implemented in internal memory of the single application specific integrated circuit such that the triphone information is obtained from the triphone information cache if the triphone information is stored in the triphone information cache; and
if the triphone information for the first triphone of the next word to be activated is not stored in the triphone information cache, retrieve the triphone information from external memory.

8. The backend search engine of claim 1 wherein a first patch list bit vector comprising a bit for each word in a vocabulary of the speech recognition system is provided and bits in the first patch list bit vector corresponding to the words to be activated in the current frame are set, and the fetch stage is further adapted to process the first patch list bit vector to identify the next word to be activated from the patch list.

9. The backend search engine of claim 8 wherein the language model stage is further adapted to, for each completed word of the one or more completed words for each of the one or more words to be activated in the next frame, set corresponding bits in a second patch list bit vector and add corresponding entries in the patch list.

10. The backend search engine of claim 9 wherein for the next frame, the first and second patch list bit vectors are toggled such that the second patch list bit vector is utilized by the fetch stage to identify words to be activated in the next frame and the first patch list bit vector is utilized by the language model stage to signify words to be activated in a frame following the next frame.

11. The backend search engine of claim 9 wherein the first and second patch list bit vectors are stored in internal memory of the single application specific integrated circuit, and the patch list is stored in external memory.

12. The backend search engine of claim 1 wherein each triphone model of the series of triphone models includes a plurality of states having corresponding senones, and for each triphone model of the series of triphone models, the updating stage is adapted to update state scores for the plurality of states of the triphone model based on senone scores of the corresponding senones.

13. The backend search engine of claim 12 wherein for each triphone model of the series of triphone models, the updating stage is adapted to:
perform a lookup in a triphone-to-senone mapping cache implemented in internal memory of the single application specific integrated circuit for a triphone-to-senone mapping for a triphone represented by the triphone model such that the triphone-to-senone mapping is obtained from the triphone-to-senone mapping cache if the triphone-to-senone mapping is stored in the triphone-to-senone mapping cache;
retrieve the triphone-to-senone mapping for the triphone represented by the triphone model from external memory if the triphone-to-senone mapping is not stored in the triphone-to-senone mapping cache;
obtain the senone scores for the corresponding senones for the plurality of states of the triphone model using the triphone-to-senone mapping; and
update the state scores for the plurality of states of the triphone model based on the senone scores.

14. The backend search engine of claim 1 wherein each of at least one of the fetch stage, the updating stage, the transition and prune stage, and the language model stage is implemented as a plurality of piplelined sub-stages enabled to simultaneously process different triphone models.

15. A method of operating a hardware implemented backend search engine for a speech recognition system comprising:
merging, at a fetch stage implemented on a single application specific integrated circuit, a first plurality of active triphone models and a second plurality of triphone models for words to be activated for a current frame of sampled speech to output a series of triphone models to be processed for the current frame;
updating, at an updating stage implemented on said single application specific integrated circuit, each triphone model of the series of triphone models based on senone scores received from an acoustic scoring stage of the speech recognition system for the current frame to output a series of updated triphone models;
processing the series of updated triphone models at a transition and prune stage implemented on said single application specific integrated circuit; and
for each completed word of one or more completed words detected by the transition and prune stage for the current frame, identifying, at a language model stage implemented on said single application specific integrated circuit, one or more words that are likely to be uttered next based on the completed word as words to be activated in a next frame of sampled speech;
wherein the fetch stage, the updating stage, the transition and prune stage, and the language model stage are configured in a pipeline architecture such that the fetch stage, the updating stage, the transition and prune stage, and the language model stage are enabled to simultaneously process different triphone models;
and wherein the first plurality of active triphone models are stored in an active queue arranged by word and the words to be activated in the current frame are stored in a patch list arranged by word, and merging the first plurality of active triphone models and the second plurality of triphone models for the words to be activated for the current frame comprises:
retrieving a next active triphone model from the active queue;
identifying a next word to be activated from the patch list;
outputting the next active triphone model retrieved from the active queue if the next active triphone model retrieved from the active queue represents a triphone of a word that precedes the next word to be activated; and
outputting a new triphone model for a first triphone of the next word to be activated if the next active triphone model retrieved from the active queue represents a triphone of a word that follows the next word to be activated.

16. The method of claim 15 wherein the triphone models stored in the active queue and the words stored in the patch list are arranged alphabetically.

17. The method of claim 15 wherein merging the first plurality of active triphone models and the second plurality of triphone models for the words to be activated for the current frame further comprises, if the next active triphone model retrieved from the active queue represents a triphone of a word that is a same word as the next word to be activated:

outputting a new triphone model representing a first triphone of the next word to be activated if the next active triphone model does not represent a first triphone of the word; and if the next active triphone model represents the first triphone in the word, updating the next active triphone model based on data from an entry in the patch list for the next word to be activated to provide an updated next triphone model and output the updated next triphone model.

18. The method of claim 17 wherein outputting the new triphone model for the first triphone of the next word to be activated comprises:

retrieving triphone information describing the first triphone of the next word to be activated;

retrieving the data from the entry in the patch list for the next word to be activated;

combining the triphone information and the data from the entry in the patch list to provide the new triphone model for the first triphone of the next word to be activated; and outputting the new triphone model.

19. The method of claim 18 wherein retrieving the triphone information comprises:

performing a lookup for the triphone information for the first triphone of the next word to be activated in a triphone information cache implemented in internal memory of the single application specific integrated circuit such that the triphone information is obtained from the triphone information cache if the triphone information is stored in the triphone information cache; and if the triphone information for the first triphone of the next word to be activated is not stored in the triphone information cache, retrieving the triphone information from external memory.

20. The method of claim 17 wherein updating the next triphone model for the first triphone of the next word to be activated comprises:

retrieving triphone information describing the first triphone of the next word to be activated;

retrieving the data from the entry in the patch list for the next word to be activated; and combining the triphone information, the data from the entry in the patch list, and data in the next triphone model to provide the updated next triphone model.

21. The method of claim 20 wherein retrieving the triphone information comprises:

performing a lookup for the triphone information for the first triphone of the next word to be activated in a triphone information cache implemented in internal memory of the single application specific integrated circuit such that the triphone information is obtained from the triphone information cache if the triphone information is stored in the triphone information cache; and if the triphone information for the first triphone of the next word to be activated is not stored in the triphone information cache, retrieving the triphone information from external memory.

22. The method of claim 15 wherein a first patch list bit vector comprising a bit for each word in a vocabulary of the speech recognition system is provided and bits in the first patch list bit vector corresponding to the words to be activated in the current frame are set, and identifying the next word to be activated from the patch list comprises identifying the next word to be activated from the patch list based on the first patch list bit vector.

23. The method of claim 15 wherein each triphone model of the series of triphone models includes a plurality of states having corresponding senones, and for each triphone model of the series of triphone models, updating the triphone model comprises updating state scores for the plurality of states of the triphone model based on senone scores of the corresponding senones.

24. The method of claim 23 wherein for each triphone model of the series of triphone models, updating the state scores for the plurality of states of the triphone model comprises:

performing a lookup in a triphone-to-senone mapping cache implemented in internal memory of the single application specific integrated circuit for a triphone-to-senone mapping for a triphone represented by the triphone model such that the triphone-to-senone mapping is obtained from the triphone-to-senone mapping cache if the triphone-to-senone mapping is stored in the triphone-to-senone mapping cache;

retrieving the triphone-to-senone mapping for the triphone represented by the triphone model from external memory if the triphone-to-senone mapping is not stored in the triphone-to-senone mapping cache;

obtaining the senone scores for the corresponding senones for the plurality of states of the triphone model using the triphone-to-senone mapping; and updating the state scores for the plurality of states of the triphone model based on the senone scores.

\* \* \* \* \*